United States Patent
Esposito et al.

(10) Patent No.: US 10,692,122 B2
(45) Date of Patent: Jun. 23, 2020

(54) METHOD AND SYSTEM FOR FACILITATING PURCHASE OF VEHICLES BY BUYERS AND/OR SALE OF VEHICLES BY SELLERS

(71) Applicant: CarCo Technologies, Inc., Chicago, IL (US)

(72) Inventors: Thomas Esposito, Chicago, IL (US); John Manganaro, Chicago, IL (US); Tomasz Kozlowski, Des Plaines, IL (US); Jacob Whitver, Rolling Meadows, IL (US); Justin Mahlik, Hinsdale, IL (US); Kayne Grau, Glenview, IL (US)

(73) Assignee: CarCo Technologies, Inc., Chicago, IL (US)

( * ) Notice: Subject to any disclaimer, the term of this patent is extended or adjusted under 35 U.S.C. 154(b) by 552 days.

(21) Appl. No.: 15/465,482

(22) Filed: Mar. 21, 2017

(65) Prior Publication Data

US 2017/0270580 A1   Sep. 21, 2017

Related U.S. Application Data

(60) Provisional application No. 62/311,841, filed on Mar. 22, 2016, provisional application No. 62/311,378, filed on Mar. 21, 2016.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0613* (2013.01); *G06Q 30/0201* (2013.01); *G06Q 30/0605* (2013.01)

(58) Field of Classification Search
None
See application file for complete search history.

(56) References Cited

U.S. PATENT DOCUMENTS 7,184,974 B2   2/2007   Shishido
8,589,212 B2   11/2013  Pollak et al.
(Continued)

FOREIGN PATENT DOCUMENTS

WO   WO2011002625 A1   1/2011
WO   WO2014100616 A1   6/2014

OTHER PUBLICATIONS

MAMSoftware.com, "Carside Table App" <https://web.archive.org/web/20150826122259/https://www.mamsoftware.com/en/carside-tablet-app> (Year: 2015).*
(Continued)

*Primary Examiner* — Abby J Flynn
(74) *Attorney, Agent, or Firm* — Lempia Summerfield Katz LLC

(57) ABSTRACT

A data platform may comprise a machine learning model indicative of a propensity of a buyer to buy a respective vehicle of a plurality of vehicles for sale. The data platform may execute the machine learning model on vehicle-related data for the plurality of vehicles to determine a propensity to buy score for a respective vehicle. Each of the vehicles may then be sorted by its propensity to buy score. A client terminal may display a list of vehicles for the buyer to buy, where the list is ordered such that a first vehicle in the list has a highest propensity to buy score and a last vehicle in the list has a lowest propensity to buy score.

19 Claims, 15 Drawing Sheets

(56) References Cited

U.S. PATENT DOCUMENTS

| | | | |
|---|---|---|---|
| 8,645,193 B2 | 2/2014 | Swinson et al. | |
| 9,189,960 B2* | 11/2015 | Couch | G08G 1/168 |
| 9,805,697 B1* | 10/2017 | Dorrance | G09G 5/40 |
| 2004/0078444 A1* | 4/2004 | Malik | G06Q 10/107 |
| | | | 709/206 |
| 2004/0138962 A1* | 7/2004 | Kopelman | G06Q 30/02 |
| | | | 705/26.41 |
| 2005/0289048 A1* | 12/2005 | Kwan | G06Q 20/10 |
| | | | 705/39 |
| 2007/0005449 A1* | 1/2007 | Mathew | G06Q 30/06 |
| | | | 705/26.1 |
| 2007/0130201 A1* | 6/2007 | Ratliff | G06Q 30/02 |
| 2008/0052134 A1* | 2/2008 | Nowak | G06Q 10/10 |
| | | | 705/4 |
| 2008/0201161 A1* | 8/2008 | Kearns | G06Q 40/00 |
| | | | 705/1.1 |
| 2008/0306812 A1 | 12/2008 | Bowen et al. | |
| 2010/0198629 A1 | 8/2010 | Weisleder et al. | |
| 2010/0332291 A1 | 12/2010 | Smith | |
| 2011/0202471 A1 | 8/2011 | Scott et al. | |
| 2011/0218825 A1* | 9/2011 | Hertenstein | G06Q 40/08 |
| | | | 705/4 |
| 2013/0124310 A1* | 5/2013 | Barbieri | G06Q 30/02 |
| | | | 705/14.49 |
| 2013/0197971 A1 | 8/2013 | Wilke | |
| 2014/0067800 A1 | 3/2014 | Sharma | |
| 2014/0180882 A1 | 6/2014 | Berger et al. | |
| 2014/0195562 A1* | 7/2014 | Hardeniya | G06Q 30/0256 |
| | | | 707/776 |
| 2014/0229316 A1* | 8/2014 | Brandon | G06Q 50/30 |
| | | | 705/26.4 |
| 2015/0025993 A1* | 1/2015 | Kiglies | G06Q 30/0278 |
| | | | 705/26.3 |
| 2015/0081519 A1* | 3/2015 | Brereton | G06Q 30/0206 |
| | | | 705/38 |
| 2015/0199743 A1* | 7/2015 | Pinel | G06Q 30/0631 |
| | | | 705/26.7 |
| 2015/0253850 A1* | 9/2015 | Behles | G06F 3/0488 |
| | | | 715/702 |
| 2016/0005070 A1* | 1/2016 | Burr | G06Q 30/0253 |
| | | | 705/14.51 |
| 2016/0012494 A1* | 1/2016 | Lasini | G06Q 30/0278 |
| | | | 705/306 |
| 2016/0307250 A1* | 10/2016 | McDouall | G06Q 30/0601 |
| 2018/0025398 A1 | 1/2018 | Berger et al. | |

OTHER PUBLICATIONS

Auto Rental News, "Technology Redefines Vehicle Damage Tracking" <https://www.autorentalnews.com/156220/technology-redefines-vehicle-damage-tracking> (Year: 2015).*

DealersLink: Deal Smart. Deal Direct "About Us," http___public.dealerslink.com_about-dealerslink.html, accessed Nov. 16, 2015, 2 pages.

DealersLink: Deal Smart. Deal Direct "Industry Leading Dealership Analytics." http___public.dealerslink.com_analytics.html, accessed Nov. 16, 2015, 3 pages.

PCT Search Report for Application No. PCT/US2018/023508, dated Jun. 11, 2018.

Written Opinion for Application No. PCT/US2018/023508, dated Jun. 11, 2018.

* cited by examiner

1100

| DRIVIN | | | |
|---|---|---|---|
| 2014 BMW 535<br>VIN XXXXXXXXXX STK XXXXXX | | | ✕ CANCEL |
| ① CONDITION | ② TIRES | ③ PAINT & BODY | ④ OPTIONS & PRICING |

Providing accurate condition information gives us the extra info we need to get this moving fast.
SELECT ONE FOR EACH SECTION

FRAME
- ○ No frame/structural damage
- ● Frame/structure has been repaired
- ○ Frame has unrepaired damage

[Optional comments...]

MECHANICAL
- ○ Mechanically sound, all accessories operable
- ● Mechanically sound, may require minor repair/maintenance (e.g., breaks, rotors, shocks, motor, mounts)
- ○ Not mechanically sound, requires repair/maintenance (e.g., engine)

[Optional comments...]

ELECTRICAL
- ○ Electrically sound. All accessories operable
- ● Electrically sound, may require minor repair/maintenance (e.g., interior lights out, brake lights, head lights)
- ○ Electrical issues prohibiting vehicle from operating properly (e.g., radio, navigation, battery connectivity)

[Optional comments...]

INTERIOR
- ○ No missing parts, cuts, tears, burns, signs of wear or odors
- ● Minimal signs of wear, no odor, may require minor repair
- ○ Signs of excessive wear (e.g. burns, cuts, tears, odors)

[Optional comments...]

| | | | |
|---|---|---|---|
| PREVIOUS ACCIDENTS | ○ Yes | ● No | If yes, describe... |
| RUST DAMAGE | ○ Yes | ● No | If yes, describe... |
| AFTERMARKET MODIFICATIONS | ○ Yes | ● No | If yes, describe... |
| KEYS | ○ 2 Sets | ● 1 Set | |
| BOOKS | ○ Yes | ● No | |

FIG. 11

| DRIVIN |||||
|---|---|---|---|---|
| 2014 BMW 535 VIN XXXXXXXXXX STK XXXXXX |||| ✕ |
| ✓ CONDITION | ✓ TIRES | ✓ PAINT & BODY | ❹ OPTIONS & PRICING ||

For your reference select your trim to see Black Book wholesale pricing.*

1402 {

TRIM

| 535i | ⇕ |
|---|---|

| ○ Clean | $29925 |
|---|---|
| ● Avg (Recommended) | $28450 |

WHOLESALE PRICE

| $28450 | ⇕ |
|---|---|

SELECT ANY MAJOR OPTIONS

| ☐ Navigation | ☐ Back-Up Cam |
|---|---|
| ☐ Entertainment | ☐ Leather |
| ☐ Sunroof | ☐ Premium Wheels |
| ☐ Add Feature... | ☐ Add Feature... |

FIG. 14

METHOD AND SYSTEM FOR FACILITATING PURCHASE OF VEHICLES BY BUYERS AND/OR SALE OF VEHICLES BY SELLERS

CROSS-REFERENCE TO RELATED APPLICATIONS

This application claims the benefit of priority under 35 USC § 119(e) to U.S. Provisional Application Ser. No. 62/311,378 filed on Mar. 21, 2016 and entitled "Automobile Inventory Sourcing System" and to U.S. Provisional Application Ser. No. 62/311,841 filed on Mar. 22, 2016 and entitled "Automobile Inventory Sourcing System". The entire contents of each of U.S. Provisional Application Ser. Nos. 62/311,378 and 62/311,841 is incorporated herein by reference.

BACKGROUND

A car dealer is in a business of buying and selling vehicles. The dealer may buy/acquire inventory from a variety of sources. For example, the dealer may search the Internet for vehicles offered for sale by other dealers and/or private individuals, and contact the seller to negotiate a purchase. Additionally, or alternatively, the dealer may monitor vehicles offered at auction and bid for vehicles of interest. Further, the dealer may acquire inventory from customer trade-ins. After buying/acquiring the vehicles, the dealer typically offers the vehicles for sale. The hope is that the dealer will sell the vehicle for more than the cost of acquiring the vehicle and in the shortest period of time. To achieve these goals, the dealer may advertise the vehicle in a variety of ways. The advertising may involve offering the vehicle for sale in newspaper ads, mass mailings, on Internet websites, and/or by calling potential buyers based on sales leads.

Overview

Conventional ways to buy and sell vehicles requires significant efforts on the part of both the buyer and the seller. A network arrangement is disclosed herein which facilitates the purchase of vehicles by buyers, the sale of vehicles by sellers, and/or the management of vehicle inventory using a data-driven approach. According to the methods and systems disclosed herein, sellers of vehicles may be electronically matched with buyers of vehicles thereby resulting in faster and more efficient vehicle transactions. The methods and systems disclosed herein may be utilized by any potential buyer and seller of vehicles and may be particularly advantageous for car dealers who are in the business of buying and selling used vehicles.

The network arrangement may include an intelligent data platform configured to communicate with a communication network having one or more output systems, such as client terminals in the form of computers. At its core, the data platform may have a data science engine. The data science engine may have hardware and software which define and/or execute one or more statistical data models. The data models may include a propensity to buy (PTB) model and a propensity to sell (PTS) model. The PTB model may identify a propensity for a buyer to buy a vehicle. The PTS model may identify a propensity for a seller to sell a vehicle.

The PTB model may take as input certain vehicle-related data and output a probability indicative that a negotiation of a given vehicle between a buyer and seller will be successful as a sale. The PTB score may take the form of a number that falls within a numerical range from 0 to 1 or 0% to 100% etc. The higher the score, the more likely the buyer may purchase this vehicle. Conversely, the lower the score, the less likely the buyer may purchase this vehicle. For example, a score closer to 1 or 100% may indicate that a sale is very likely. On the other hand, a score closer to 0 or 0% may indicate that it is very unlikely that a buyer will buy the vehicle. Likewise, the PTS model may take as input certain vehicle-related data and output a probability that a seller will sell a certain vehicle. The PTS score may range from 0 to 1 or 0% to 100% etc. For example, a PTS score closer to 1 or 100% may indicate that it very likely that the seller will sell the vehicle and a PTS score of 0 or 0% may indicate that it is very unlikely that the seller will sell the vehicle.

In some cases, a human, e.g., an account representative that is assigned to a buyer, may review the PTB score for a vehicle as output by the PTB model, as well as other information about the buyer, and confirm whether the vehicle would be of interest to the buyer. The confirmation might be based on information known to the account representative about certain types of vehicles that the buyer may be looking for. Similar review may also be conducted for the PTS score.

After a data model has been applied to certain vehicle-related data, the results may be presented to a user (e.g., a potential buyer or seller) via a client terminal. The client terminal may present one or more graphical user interfaces to the user. In the case of a potential buyer, a BUY page may be presented to the buyer via the graphical interface, where the BUY page identifies a number of vehicles that can be purchased. The vehicles may be sorted such that certain vehicles at a beginning of the list are considered vehicles more likely for the buyer to purchase. On the other hand, certain vehicles at an end of the list may be less likely for the buyer to buy Criteria for how the vehicles are sorted may include one or more of the PTB score, type of vehicle, mileage on the vehicle, year of the vehicle, when information associated with the vehicle is updated, and specific knowledge of an account representative of whether a buyer would be interested in purchasing the vehicle. Similarly, in the case of a potential seller, a SELL page may be presented to the seller via the graphical user interface, where the SELL page identifies a number of vehicles that the seller is offering for sale (e.g., all the vehicles on a used car dealers lot). The vehicles may be sorted based on the PTS score such that certain vehicles at a beginning of the list are considered vehicles more likely for the seller to sell. On the other hand, certain vehicles at an end of the list may be less likely for the seller to sell.

On a vehicle data page, the graphical user interface may present the buyer with interactive selectable icons to indicate whether the buyer is interested or not interested in a particular vehicle. For example, the vehicle data page may have selectable icons in the form of a "pass" and a "request" option so that the buyer can indicate that the buyer is either not interested in the vehicle or interested in the vehicle, respectively. The indication to pass or request with respect to a given vehicle may also be input into the PTB model so that the PTB model may adjust a PTB score for the given vehicle and/or so that the PTB model may learn a buyer's preferences and more accurately determine the appropriate PTB score for future vehicles presented to a buyer. For example, if a buyer has "requested" a given vehicle, then the next time the PTB model in run on that vehicle, information indicating that the vehicle was previously requested by the buyer may be input into the PTB model, thereby resulting in a PTB score that is higher than it would have otherwise been as the buyer may be more inclined to purchase that vehicle. As another example, if a buyer has a history of previously "requesting" a certain vehicle make and/or model, then the next time the PTB model in run on that vehicle make and/or model, information indicating that the vehicle make and/or model was previously requested by the buyer may be input into the PTB model, thereby resulting in a PTB score that is higher than it would have otherwise been as the buyer may be more inclined to purchase that vehicle make and/or model. Conversely, if a given vehicle has already been "passed" on by a particular buyer or is similar to those vehicles which the buyer has previously "passed" on, then information indicating that the given vehicle or given vehicle's make and/or model may be input into the PTB model, thereby resulting in a PTB score that is lower than it would have otherwise been as the buyer may not be inclined to purchase that vehicle.

A chat option is another feature that the intelligent data platform may provide via a graphical user interface. The chat option may allow a buyer and/or seller (and/or account representative of the buyer and/or seller) to electronically dialog with the other. The chat option may be used by a buyer and/or seller to negotiate about a vehicle such as pricing or condition of the vehicle. Selection of the chat option may cause a chat window to be presented which allows a buyer, e.g., a buyer account representative, or seller, e.g., a seller account representative, to communicate electronically and/or in real time with another buyer or seller, for example, to obtain information about the vehicle. When a buyer or seller is viewing a specific vehicle and selects the chat option, the chat window may include an indication that the dialog (e.g., a question about the vehicle) is specific to a certain vehicle. This is particularly useful if a buyer or seller asks multiple questions about different vehicles as it provides a way to distinguish between dialogs directed to different vehicles. Further, the chat may retain a history of communications between the buyer and any other seller. The history of communications may be scrollable so that the buyer can go back to previous communications at any time.

The network arrangement may also allow the seller to add a vehicle for sale to a product database. Adding a vehicle to the product database may effectively be an offer by the seller to sell a vehicle which can be later reviewed a buyer. By providing this feature, the product database may be populated with vehicles for sale.

A wholesale request may be presented on the client terminal for the seller to start the process of adding a vehicle for sale. Selection of this option may require the seller to indicate a condition of the vehicle.

In one example, the condition form may allow the seller to enter information about one or more of a frame condition, mechanical condition, electrical condition, interior condition of the vehicle, among others. To reduce the time needed to complete this form, some condition information may be preselected to reflect a common condition for that condition. For example, the interior condition of the vehicle may be preselected as "average" from options of "average", "poor" and "excellent." The preselected option may represent a most common condition for the interior condition for vehicles sold in a region. As the condition of vehicles in the region changes, the data science model may be updated such that the preselected information may change to reflect the common condition. For example, the interior condition preselected may change to "poor" if most vehicles sold in the region have such an interior condition. The completed condition form may be stored in a database such as the sales management database and/or product database.

In another example, the condition form may be an interactive graphical user interface for marking tire tread. The tire tread may be indicated for each tire by indicating on the graphical user interface an amount of tire tread left for each tire of the vehicle offered for sale. Additionally, a gray level on an image of the tire on the graphical user interface may be correlated to the amount of indicated tire tread. Again, the completed condition form may be stored in a database such as a sales management database and/or a product database.

In yet another example, the condition form may be an interactive graphical user interface for marking defects on a body of a vehicle. The graphical user interface may show body panels for a vehicle. A seller may provide an indication of where a defect is present on a body panel such as a mouse click at that location. The indication may cause a menu to be presented where the seller can further identify a type of a defect on the body of the vehicle, e.g., dented, faded, cracked, paint chip, etc. The type of defect may additionally be shown on the illustrated body panels by a unique symbol. In some cases, the condition form may allow for the seller to provide to the data platform a digital image of the defect which is associated with the symbol. In turn, hovering a mouse cursor over the symbol may cause a picture of the defect to be displayed, e.g., when a buyer reviews the condition form. The completed condition form may be stored in a database such as the sales management database and/or product database.

In addition to completing one or more of the described condition forms, a seller may also complete a price form. The price form may request that the seller indicate a price for the vehicle. In one example, the seller may provide this price. In another example, the data platform may provide the pricing for the seller instead of allowing the seller to provide pricing.

The pricing provided by the data platform may be a retail or wholesale price defined by a third-party database such as "Kelly Bluebook" or "NADA." The condition of the vehicle, as identified by the condition forms, may be provided to the third-party database and the third-party database may return the pricing. Alternatively, a pricing model may be used to provide the pricing. The pricing model may be a machine learning model that predicts pricing for the vehicle based on numerous input variables.

In one example, the pricing may be that which a vehicle will sell for at auction. Based on a condition of the vehicle indicated by the condition forms, wholesale pricing for the vehicle and/or retail pricing for the vehicle can be determined. For instance, sold prices associated with past deals of a similar vehicle may be indicative of a wholesale price and/or pricing of vehicles currently for sale as shown on websites such as www.cars.com may be indicative of a retail price. The wholesale and retail pricing as well as any negotiations with respect to the vehicle may be input into the pricing model, the model may weigh these inputs and the model may output an auction price for the vehicle. The auction pricing may tell the seller a price that the vehicle may sell for at auction.

In another example, the pricing may be a sales price associated with what a given buyer would buy the vehicle for. Based on a condition of the vehicle indicated by the condition form, wholesale pricing for the vehicle and/or retail pricing for the vehicle over a past period of time, e.g., 45 days, can be determined. A PTB score may be used by the model as an indication of success in the given buyer buying the vehicle. In this regard, the wholesale and retail pricing along with, in some cases, a PTB score for the vehicle may be input into the pricing model and the model may output a price for the vehicle indicative of what a buyer would buy the car for.

BRIEF DESCRIPTION OF THE DRAWINGS

FIG. 11 shows an example user interface presented to a seller.

FIG. 14 shows an example user interface presented to a seller.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

Embodiments described herein are directed to a network arrangement that facilitates purchase of vehicles by buyers, sale of vehicles by sellers, and/or management of vehicle inventory. The network arrangement may be used by buyers to find vehicles to purchase, by sellers to market vehicles to buyers, and/or for matching sellers with buyers who are interested in purchasing vehicles with sellers who have vehicles to sell. However, embodiments are not limited to vehicles. Other assets instead of or in addition to vehicles may also be bought or sold in accordance with the network arrangement.

Figure 1:
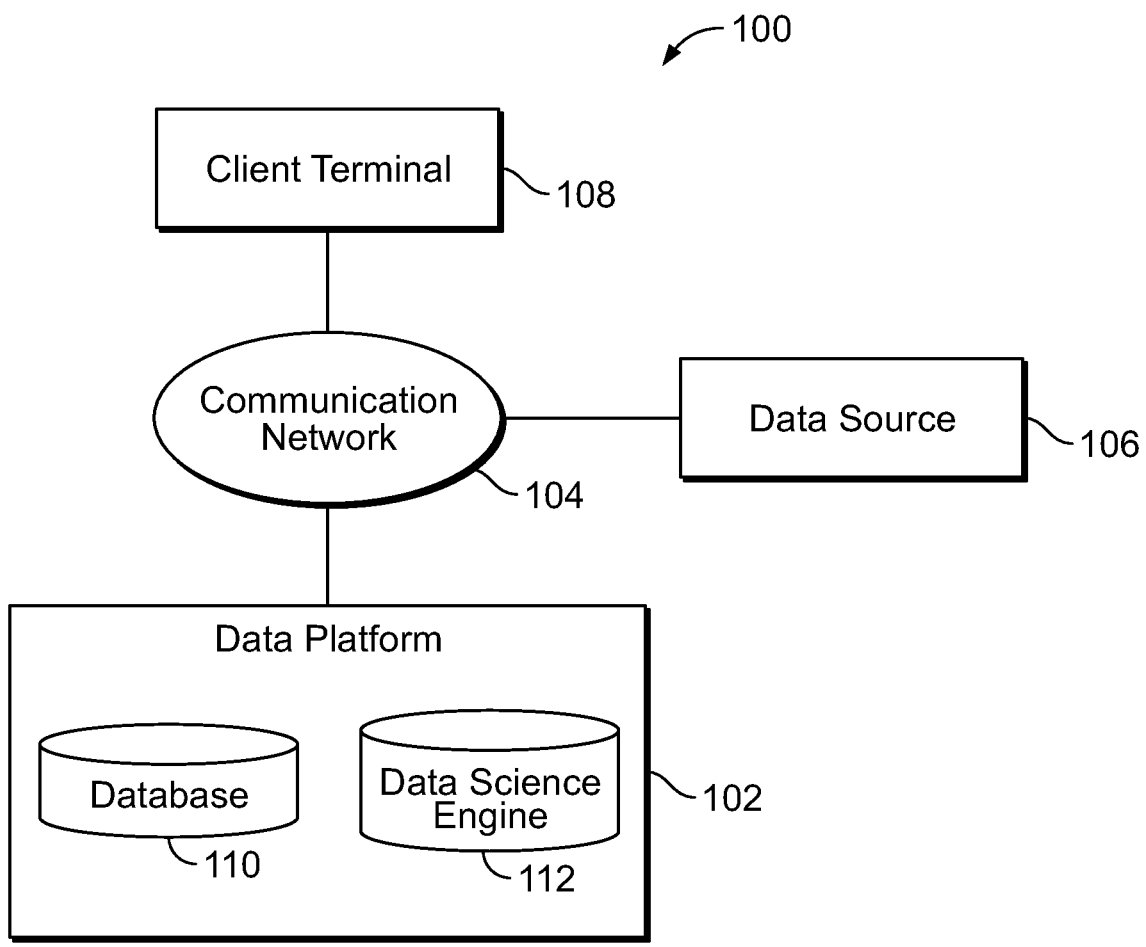
FIG. 1 depicts an example network arrangement in which example embodiments may be implemented.

FIG. 1 shows a block diagram of the exemplary network arrangement 100. At its core, the network arrangement 100 may include a data platform 102 which is configured to communicate with a communication network 104 with one or more data sources such as representative data source 106 and one or more output systems, such as representative client terminal 108. It should be understood that the network arrangement may include various other systems as well.

Broadly speaking, the data platform 102 may be configured to receive, process, and/or analyze vehicle-related data to facilitate purchase of vehicles by buyers and sale of vehicles by sellers. For instance, the data platform 102 may include one or more servers (or the like) having hardware components and software components that are configured to carry out one or more of the functions disclosed herein. For example, the data platform 102 may include a database 110 and a data science engine 112. The database may include one or more databases which store vehicle-related data. The data science engine 112 may implement one or more machine learning models which define a probabilistic relationship between vehicle-related data input into the model and probability of a result, e.g., propensity of a buyer to buy a vehicle and/or propensity of a seller to sell a vehicle which will be described in more detail below.

Additionally, the data platform 102 may include one or more user interface components that enable a data platform user to interface with the data platform 102. In practice, the data platform 102 may be located in a single physical location or distributed amongst a plurality of locations, and may be communicatively linked via a system bus, a communication network (e.g., a private network), or some other connection mechanism.

As shown in FIG. 1, the data platform 102 may be configured to communicate, via the communication network 104, with the one or more data sources 106 and/or output systems in the network arrangement 100. For example, the data platform 102 may receive vehicle-related data, via the communication network 104, that is sent by one or more data sources 106. As another example, the data platform 102 may transmit output data based on the processing, and/or analyzing of the vehicle-related data, via the communication network 104, for receipt by an output system, such as a client terminal 108. The data platform 102 may engage in other types of communication via the communication network 104 as well.

In general, the communication network 104 may include one or more computing systems and network infrastructure configured to facilitate transferring data between the computing system and the one or more sources, and/or output systems in the network arrangement 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the data platform 102 and the one or more data sources 106 and/or output systems may include one or more intermediate systems. For example, the one or more data sources 102 may send certain vehicle-related data to one or more intermediary systems, such as a gateway, and the data platform 102 may then be configured to receive the image data from the one or more intermediary systems. As another example, the data platform 102 may communicate with an output system via one or more intermediary systems, such as a host server (not shown). Many other configurations are also possible.

In general, the data source 106 may be configured to collect, store, and/or provide certain vehicle-related data to the data platform 102. The data source 106 could take the form of one or more website (and its associated databases) which advertises vehicles for sale such as "www.cars.com", "www.ove.com", or a dealer's own website. Additionally, or alternatively, the data source 106 may be simply one or more databases which stores the certain vehicle-related data associated with vehicles for sale. The data platform 102 may receive data from the data source 106 in various manners. According to one example, the data platform 102 may be configured to periodically request and receive data from the data source 106. In another example, the data platform 102 may receive data from the data source 106 by "subscribing" to a service provided by the data source 106. The data platform 102 may receive data from the data source 106 in other manners as well.

The client terminal 108 may take the form of a system or device configured to access and enable a user such as a buyer or seller to interact with the data platform 102. To facilitate this, the client terminal 108 may include hardware components such as a user interface, a network interface, a processor, and data storage, among other components. Additionally, the client terminal 108 may be configured with software components that enable interaction with the data platform, such as a web browser that capable of accessing a web application provided by the data platform 102 or a native client application associated with the computing system, among other examples. Representative examples of client terminals may include a desktop computer, a laptop, a netbook, a tablet, a smartphone, a personal digital assistant (PDA), or any other such device now known or later developed.

Figure 2:
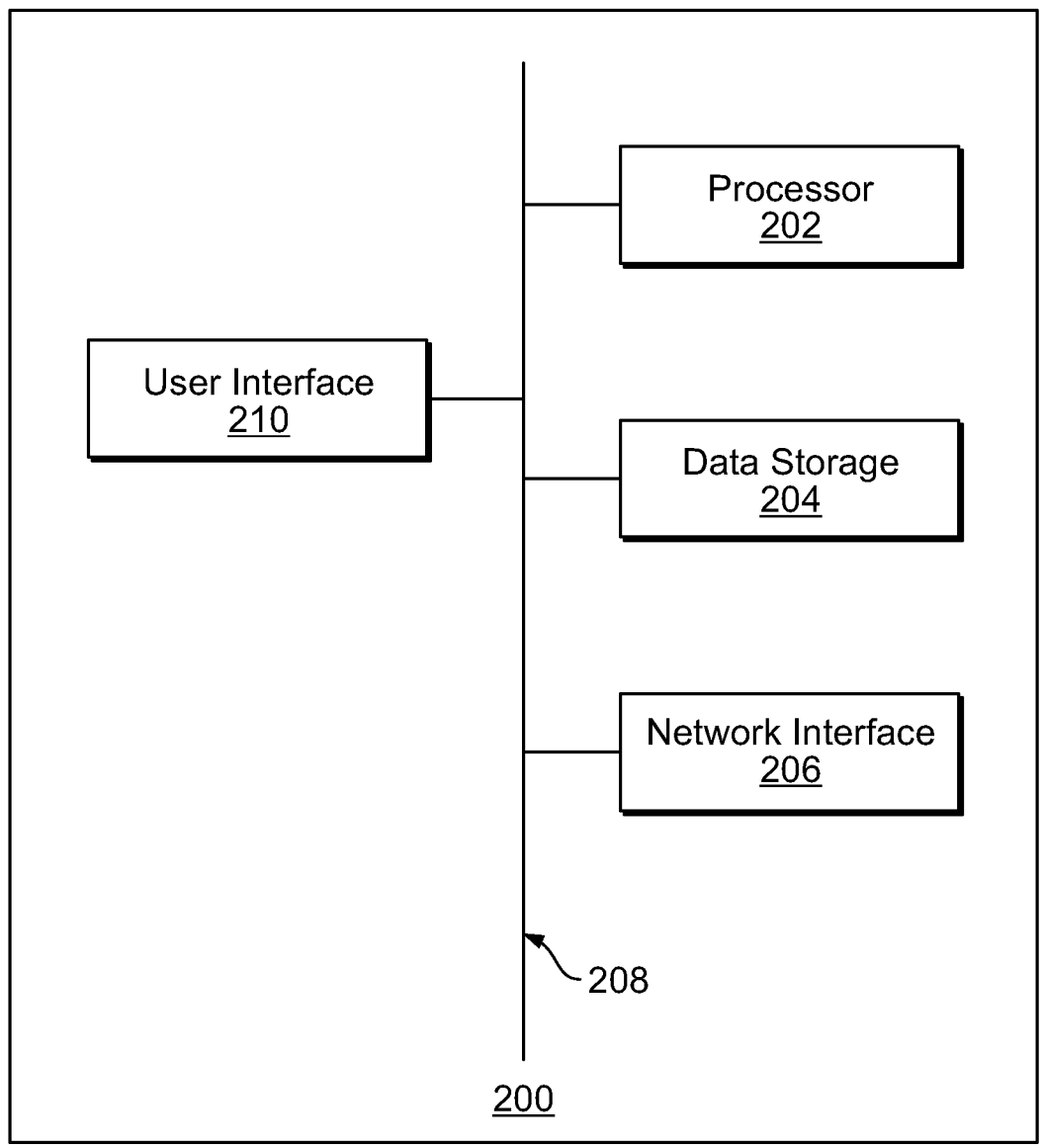
FIG. 2 depicts a structural diagram of an example data platform.

FIG. 2 is a simplified block diagram illustrating some components that may be included in an example data platform from a structural perspective. In line with the discussion above, the data platform 200 may generally comprise one or more computer systems (e.g., one or more servers), and these one or more computer systems may collectively include at least a processor 202, data storage 204, network interface 206, and perhaps also a user interface 210, all of which may be communicatively linked by a communication link 208 such as a system bus, network, or other connection mechanism.

The processor 202 may include one or more processors and/or controllers, which may take the form of a general or special-purpose processor or controller. In particular, in example implementations, the processing unit 202 may include microprocessors, microcontrollers, application-specific integrated circuits, digital signal processors, and the like.

In turn, data storage 204 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 2, the data storage 204 may be provisioned with software components that enable the data platform 200 to carry out the functions disclosed herein. These software components may generally take the form of program instructions that are executable by the processor 202, and may be arranged together into applications, software development kits, toolsets, or the like.

The network interface 206 may be configured to facilitate wireless and/or wired communication between the platform 200 and various network components via the communication network, data source, and client terminal. As such, network interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 206 may also include multiple network interfaces that support various different types of network connections, some examples of which may include Hadoop, FTP, relational databases, high frequency data such as OSI PI, batch data such as XML, and Base64. Other configurations are possible as well.

The example data platform 200 may also support a user interface 210 that is configured to facilitate user interaction with the platform 200 and may also be configured to facilitate causing the platform 200 to perform an operation in response to user interaction. This user interface 210 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 210 may include or provide connectivity to various output components, examples of which may include display screens, speakers, headphone jacks, and the like. Other configurations are possible as well, including the possibility that the user interface 210 is embodied within a client terminal that is communicatively coupled to the example platform.

Example operations of the example network arrangement 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

Figure 3:
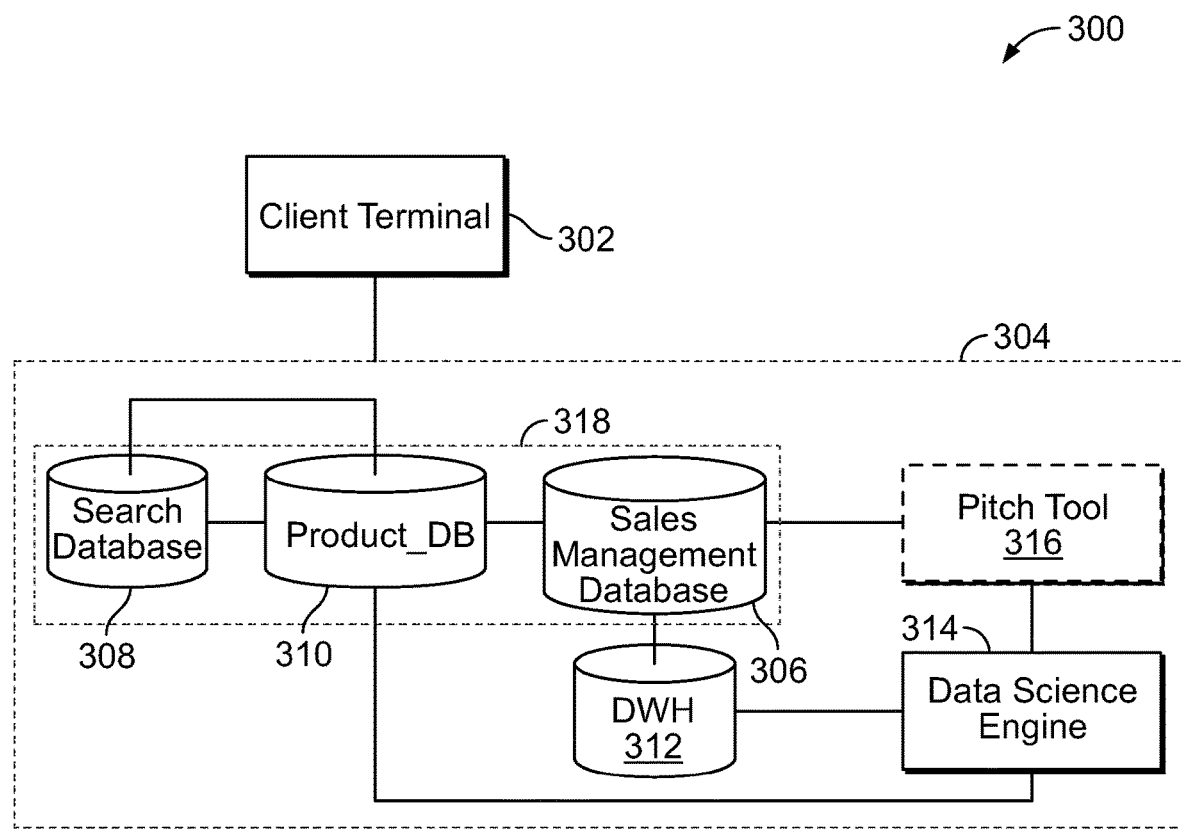
FIG. 3 depicts a more detailed structural diagram of the example data platform.

FIG. 3 shows a more detailed block diagram of a network arrangement 300 associated with facilitating purchase of vehicles by buyers. The network arrangement 300 may include a client terminal 302 which communicates with a data platform 304 via a communication network (not shown). A client terminal user, e.g., buyer, may use the client terminal 302 to send a command associated with the purchase of vehicles to the data platform 304 and the data platform 304 may send output data to the client terminal 302 in response to the command. The data platform 304 may include a sales management database 306, search database 308, a product database 310, a data warehouse (DWH) 312, a data science engine 314, and a pitch tool 316 communicatively coupled together via one or more communication links, e.g., wired or wireless links.

The sales management database 306, search database 308, product database 310, and data warehouse 312 may each be a server comprising hardware and software to facilitate retrieval and storage of vehicle-related data. Vehicle-related data may be any data managed by the data platform relating to the sale and purchase of vehicles. The vehicle-related data may include information about a vehicle for sale such as a make, model year, trim, mileage on the vehicle, vehicle condition, and price. Additionally, or alternatively, the vehicle-related data may include buyer and/or seller information such as lot size, velocity of vehicles sold, supply of vehicles, estimated revenue, days vehicles remain on the lot, and typical VIN-level characteristics for the lot (average price, mileage, etc.). Still additionally, or alternatively, the vehicle-related data may include market information associated with the buyer, seller, and where a vehicle is located such as price of vehicles in a market and/or supply of vehicles in the market. Additionally, the vehicle-related data may include information on negotiations between a buyer and/or seller and information about vehicles which a buyer may be interested in purchasing and vehicles previously pitched to the buyer. The vehicle-related data may take other forms as well.

The sales management database 306 may store vehicle-related data which that can be used to facilitate sale and purchase of a vehicle. A sales person may input the vehicle-related data into the sales management database via the user interface of the data platform. For example, the vehicle-related data stored in the sales management database may include information about a seller of the vehicle such as location of the seller, types of vehicles the seller sells, etc. Additionally, the vehicle-related data stored in the sales management database may include information about a buyer of the vehicle such as buyer's preference in the purchase of a vehicle, location of the buyer, etc. The product database 310 may also be a server comprising hardware and software to facilitate storage of vehicle-related data. A sales person, buyer, or seller may input the vehicle-related data into the sales management database via the user interface of the data platform and/or client terminal. The product database 310 may store vehicle-related data about various vehicles for sale including a price of the vehicle, age of the vehicle, condition of the vehicle, features of the vehicle, whether the vehicle is to be offered for sale to a buyer, seller of the vehicle, etc. The search database 308 may define a pool of resources, e.g., measured disk reads, disk writes, processor time, which can be allocated among databases as needed to promote efficient searching of each of the databases. The alternative to a search database 308 would be to assign resources to a database which may not be a most efficient allocation of resources when the database does not need those resources. Additionally or alternatively, the search database 308 may include an index to data stored in another database, e.g., data warehouse 312, to facilitate rapid searching of the data. The searching can include locating vehicles within a certain range such as "find me vehicles within a 5-mile radius."

The sales management database 306, search database 308, a product database 310 are shown in FIG. 3 as discrete databases for illustration purposes only. In some examples, one or more of these databases may be implemented as a combined database. In one arrangement, the sales management database 306, the database 308, and the product database 310 may be combined into a single database shown as combined database 318. In another arrangement, the sales management database 306 and the product database 310 may be combined into a single database. Other variations are also possible.

The data platform 304 may also include a data warehouse 312. The data warehouse 312 may be a database which stores certain vehicle-related data obtained from and/or provided by the data source and the sales management database 306.

Further, the data platform 304 may have a data science engine 314 and a pitch tool 316. In the disclosed arrangement, the data science engine may comprise hardware and software which defines and/or executes one or more data science models to identify which vehicles to offer for sale to buyers. In one example, the model may be a propensity to buy (PTB) model which takes as input certain vehicle-related data and outputs a probability that a negotiation of a given vehicle between a buyer and seller will be successful as a sale. The PTB score may range from 0 to 1 or 0% to 100% etc. The higher the score, the more likely the buyer may purchase this vehicle. Conversely, the lower the score, the less likely the buyer may purchase this vehicle. For example, a PTB score closer to 100% or 1 may indicate a sale is very likely. On the other hand, a PTB score closer to 0 or 0% may indicate no sale is likely. Although the PTB score has been described as a range from 0 to 1 or 0% to 100%, one of ordinary skill in the art would understand that other scales could be used such as categories of "very unlikely", "unlikely", "average", "highly likely", "very likely" etc. indicative of the buyer purchasing or not purchasing the vehicle.

Pitching is a process of offering vehicles for sale to a buyer, where the vehicles offered are those which the buyer may have a most interest to purchase. The pitch tool 316 may be a feature of the data platform that is used by an account representative for the buyer to facilitate review of the PTB score associated with a vehicle to be pitched to a buyer, as well as other information about the vehicle and the potential buyer, before the vehicle is presented to the buyer. The account representative may use the pitch tool to confirm whether the vehicle is indeed of interest to the buyer.

Figure 4:
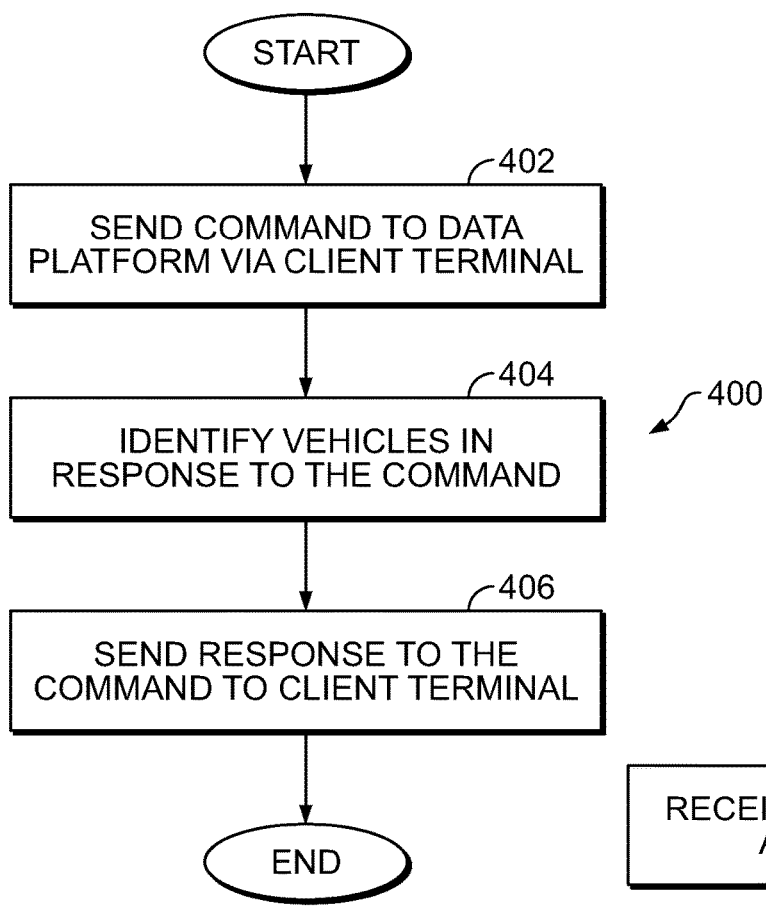
FIG. 4 is a flow diagram of example functions associated with identifying vehicles for sale to a buyer.

FIG. 4 shows a flow diagram 400 associated operation of the network arrangement in FIG. 3 to facilitate identifying vehicles to sell to a buyer. Briefly, at 402, a command may be sent to the data platform via a client terminal. At 404, vehicles may be identified in response to the command. At 406, a response to the command may be sent to the client terminal.

Referring back, at 402, the client terminal may send a command to the data platform. For example, a buyer using the client terminal may cause the client terminal to send the command. The command may take a variety of forms. In one implementation, the command may take the form of a pitch request which uniquely identifies the buyer, e.g., by a dealer ID. The pitch request may be a request to identify those vehicles which the buyer would be interested in purchasing as confirmed by someone who is familiar with the buyer's interests such as an account representative of the seller. The pitch request might be sent automatically upon a buyer being authorized to access the data platform, e.g., as part of an authentication process, or by selection of an option on the client terminal. In another implementation, the command may take the form of a search request. The search request may be a request sent by the buyer to search vehicles for sale which the buyer would be interested in purchasing. Search criteria may include vehicles to be searched in a locality, by year, mileage, price, etc. Vehicles that match the search criteria are presented. The search request may include additional vehicles than what might be presented in response to the pitch request.

At 404, vehicles may be identified in response to the command. As part of identifying the vehicles, data may be generated that indicates whether a specific vehicle is to be pitched to a specific buyer. This data may be stored in the product database. For example, the data may include for a vehicle a dealer ID which uniquely identifies the dealer to which the vehicle is to be pitched. The search database may facilitate searching the product database by locating those vehicles in the product database with data that indicates the dealer ID included in the pitch request. In response to the pitch request, the data platform may identify possible candidate vehicles which were confirmed by someone who is familiar with the buyer's interests such as an account representative of the buyer. The vehicles identified in this manner may be referred to as "staff picks" or "pitched opportunity vehicles" because of the human involvement. In the case of the search request, the search database may facilitate searching the product database for vehicles that match the search criteria provided by the buyer and may not rely exclusively on identifying vehicles as confirmed by someone who is familiar with the buyer's interest.

At 406, the data platform may send a response to the command to the client terminal. The response may take the form of information to be presented to the buyer via a user interface. The response may identify the vehicles that the buyer might be interested in purchasing.

Figure 5:
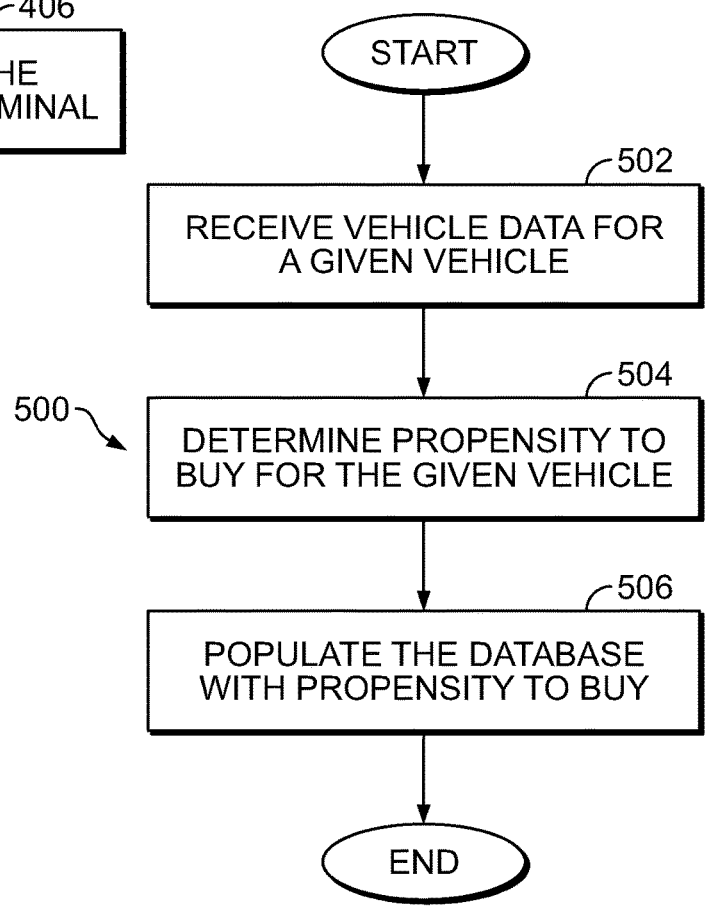
FIG. 5 is a flow diagram of example functions associated with determining a propensity to buy for a buyer.

FIG. 5 shows a more detailed flow diagram of functions associated with identifying the vehicles that the buyer might be interested in purchasing via the pitch request and/or search request. The data science engine, data warehouse, product database, sales management database, search database, and/or pitch tool may facilitate this process. Briefly, at 502 vehicle-related data may be received for a given vehicle. At 504, a propensity to buy the given vehicle may be determined. At 506, a database may be populated with the propensity to buy.

Referring back, at 502, the data science engine may receive vehicle-related data for a given vehicle. The vehicle-related data may be received from one or more of the data warehouse, sales management database, and/or product database. In some examples, the data warehouse may have duplicate information from other databases. For example, the sales management database may update the data warehouse whenever information in the sales management database is updated. In this case, relevant vehicle-related data may only need to be received by the data science engine from limited ones of the other databases such as the data warehouse. Other variations are also possible.

The vehicle-related data may take variety of forms. For example, the vehicle-related data may include vehicle identification number (VIN) and details about the vehicle such as age and mileage of the vehicle, e.g., as indicated by external databases such as www.carfax.com. Additionally, or alternatively, the vehicle-related data may include information about a buyer. In the case that the buyer is a dealer, the information may include types of vehicles on his lot, average price of vehicles on his lot, mileage of vehicles on his lot, etc. This information is relevant to a purchase as the buyer may be inclined to buy a similar type of vehicle for sale. Additionally, or alternatively, the vehicle-related data may include information about past dealings with the buyer. The dealings may include what types of vehicles the buyer has expressed interest in the past for, has not expressed interest in the past for, and vehicles which the buyer searched for and/or has requested more information for. Mechanisms for collecting some of this information are illustrated below in the context of the example user interfaces shown in FIGS. 6 and 7. The vehicle-related data may also include whether a particular vehicle was already pitched to the buyer in the past.

In addition, the PTB model may receive vehicle-related data in the form of a market profile for the locality where the buyer is located. The locality may be a certain geographic area where the buyer is located. The market profile may identify supply and demand in a market and/or trends in a market where the buyer is located, such as which types of vehicles are popular and/or not popular in the market so that appropriate vehicles may be pitched to the buyer.

At 504, the data science engine may apply a propensity to buy (PTB) model to one or more of the above-described vehicle-related data inputs to determine a probability that a buyer may buy the given vehicle, e.g., propensity to buy score. The PTB model may be a machine learning model which is arranged to weigh one or more vehicle-related data input into the model. The weighting may be a number from 0 to 1 which is applied to each of the vehicle-related data inputs. The weighting may determine an impact that a vehicle-related input has on the PTB score.

The PTB model may output a probability that a buyer will buy the vehicle. For example, a PTB score closer to 100% may indicate that it very likely that the buyer will buy the vehicle and a PTB score closer to 0% may indicate that it is very unlikely that the buyer will buy the vehicle. The PTB model may be built based on various modeling techniques including one or more of a Generalized Linear Model (GLM), Random Forest (RF), Gradient Boosted Machine (GBM) and multi-layer, feedforward Deep Learning algorithm, among others to find a best weighing of the vehicle-related data input into the model that results in output of a reliable probability.

In some examples, the model may include a decision tree that makes decisions based on a vehicle-related data input into the model to arrive at the PTB score. The vehicle-related data input into the model may take a variety of forms including one or more of seller information, buyer information, and market information associated with the seller, buyer, and/or where the vehicle is located. Examples may include (i) price metrics for each MMYT associated with a dealer (where MMYT stands for make-model-year-trim of a vehicle where trim is for example, "LX" in Honda Accord LX), (ii) supply metrics for each MMYT associated with a dealer, (iii) price and supply metrics calculated for entire markets rather than individual dealers, (iv) price and supply metrics for dealers and markets calculated for all vehicles, not at the level of specific MMYT, (v) dealer-specific metrics such as lot size, velocity, estimated revenue, days on lot, and typical VIN-level characteristics (average price, mileage, etc.), and (vi) past negotiation with a dealer and vehicles pitched to the dealer. The dealer may be a seller or buyer of the vehicle.

In some cases, the vehicle-related data may impact the decision process to arrive at the PTB score in the same way, e.g., have a same weight on PTB score across different vehicles. For example, certain categorical vehicle-related data where there are limited forms that the vehicle-related data may take, such as whether a selling dealer is a franchise or independent dealer, may have a same impact on the PTB score in a decision process. In other cases, the vehicle-related data may impact the decision process to arrive at the PTB score differently, e.g., have a different weight on PTB across different vehicles. For example, certain continuous vehicle-related data such as mileage on a car which can range from 0 to 100,000 miles may have a different impact on the PTB score depending on what other vehicle-related data was previously considered. For example, if vehicle-related data A has already been considered in making a decision on vehicle related data B, then the vehicle-related data B may have a different impact (e.g., weight on PTB score) as compared to if vehicle-related data A was not considered in making a decision on vehicle related data B. Other variations are also possible.

Before being deployed to buyers, the model may be tested on known vehicle-related data and known probabilities that a buyer will buy a vehicle to verify that the model outputs a reliable probability.

At 506, the PTB model may populate the product database with the PTB score. The population may include associating a VIN of the given vehicle, a buyer identification, a seller identification with the PTB score, among other information.

In some examples, a human may review the PTB score for the given vehicle as output by the PTB model. The human may be, for example, an account representative who might be familiar with the buyer and which vehicles the buyer may purchase. The data platform may provide one or more tools to facilitate this process such as a pitch tool which displays the PTB score for a given vehicle along with vehicle-related data. Using the pitch tool, the human may review and/or confirm that the PTB score is correct for the vehicle based on knowledge about what the buyer might be interested in purchasing. The human may also use the pitch tool to identify a vehicle which is a "staff pick", e.g., a vehicle which the account representative believes, based on information about the buyer, that the buyer may be particularly interested in purchasing. Further, the human could use the pitch tool to identify a vehicle with lower PTB score as a "staff pick" because the account representative knows that the buyer is specifically interested in that type of vehicle. The identified vehicle may be stored in one or more the sales management database and/or product database and associated with the dealer ID of the buyer, seller, and VIN number of the vehicle, among other information.

The data platform may repeat the functions at 502 to 506 to determine a PTB score for one or more vehicles. Further, the PTB score for a vehicle may be updated periodically, e.g., daily, weekly, monthly etc., and may be updated manually at the direction of a human or automatically by the platform based on a predefined schedule. The update may account for changes in the vehicle-related data that is input into the model, e.g., mileage, age, etc. that might affect the PTB score output by the PTB model for a given vehicle.

Figure 6:
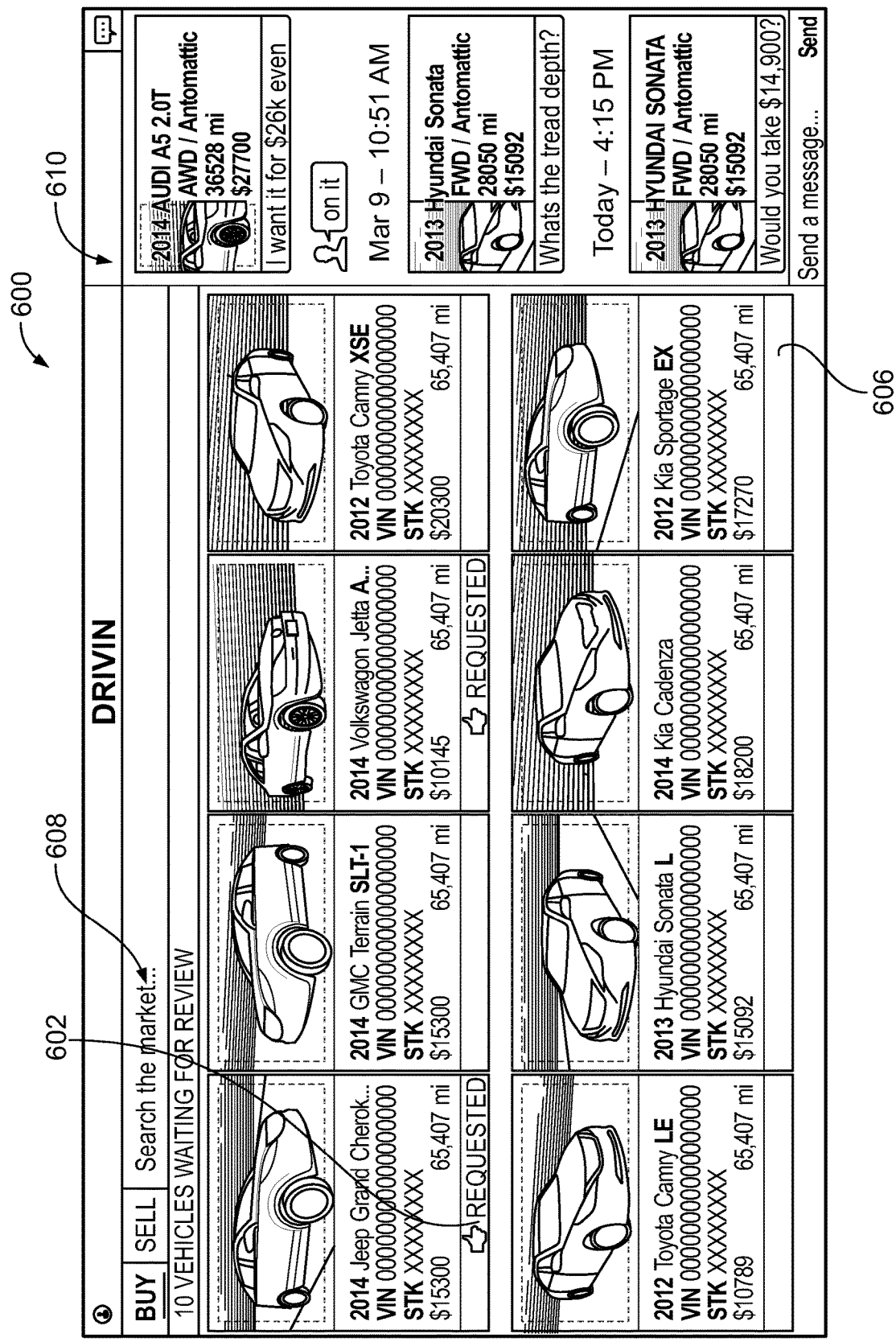
FIG. 6 shows an example user interface presented to a buyer.

FIG. 6 shows an example of a BUY page 600 presented on the client terminal. The BUY page 500 may identify vehicles that are pitched to the buyer. The vehicles pitched to the buyer may be identified by searching the product database for those vehicles having the dealer ID of the buyer and indicated as "staff pick" vehicles. As noted above, staff picked vehicles may have been identified by a human based on knowledge of the buyer and pitched to the buyer. The vehicles may be sorted such that certain vehicles at a beginning 602 of the list are considered vehicles more likely for the buyer to purchase. On the other hand, certain vehicles at an end of the list 604 may be less likely for the buyer to buy. Criteria for how the vehicles are sorted may include one or more of the PTB score, type of vehicle, mileage on the vehicle, year of the vehicle, when information associated with the vehicle is updated, and specific knowledge of an account representative of whether a buyer would be interested in purchasing the vehicle. In some examples, the pitch tool can be also used by the account representative to reorder vehicles that are pitched in the BUY page but before the BUY page is presented to a buyer, e.g., when the account representative knows a vehicle is of interest but the PTB does not reflect his fact. The sorting facilitates efficient review by a buyer of vehicles for sale so that he or she can quickly identify those vehicles worth detailed consideration, e.g., those vehicles at the beginning of list Once a buyer has identified a vehicle as being of interested (as described in more detail below), that vehicle may be indicated on the BUY page by an icon/symbol 602 such as a "thumbs up." The BUY page could also display the PTB score as well for a respective vehicle so that the buyer himself can compare the PTB score of various vehicles.

The BUY page may also provide limited capability to search for vehicles. For example, the buyer may search for vehicles after being presented with the pitched vehicles when the buyer wants to find more vehicles of interest than those which were pitched. The search capability may be provided by a search bar 608. For example, the buyer may have multiple locations, e.g., rooftops, where it has dealerships. The search bar 608 may permit the buyer to select a particular location from the multiple locations where it may have rooftops. In response, the data platform may reorder the list of vehicles based on a propensity to buy score for that specific location. The PTB score for a vehicle may differ in one location versus another location because certain vehicles may be more likely to be purchased in some areas as compared to other areas depending on demand for certain types of vehicles in that area as well as other factors such as the costs to transport the vehicles from the seller's location to the dealer's location. A vehicle may have a high PTB score in one market and a low PTB score in another market. As a result, the same vehicle may be at a beginning of the list of vehicles in one market and at an end of the list of vehicles in the other market. Other variations are also possible.

Additionally, or alternatively, the search bar 608 may permit the buyer to search within a certain distance from a location such as the rooftop of the buyer. The distance may be selected and then the list of vehicles may be reordered based on a propensity to buy meeting the distance criteria. By limiting the distance, a transport cost associated with bringing the vehicle to the location may be lessened.

In some examples, a BUY page presented on the client terminal in response to a buyer sending a search request may look similar to the BUY page 600 associated with a request to pitch. The vehicles may be ordered such that certain vehicles at a top of the list are considered vehicles more likely for the buyer to purchase, e.g., based on a propensity to buy score, and vehicles at a bottom of the list are considered vehicles less likely for the buyer to purchase. However, unlike the vehicles identified in response to the request to pitch, the vehicles identified by a search request may identify vehicles matching the search criteria provided in the search request instead of or in addition to those vehicles which were pitched.

Figure 7:
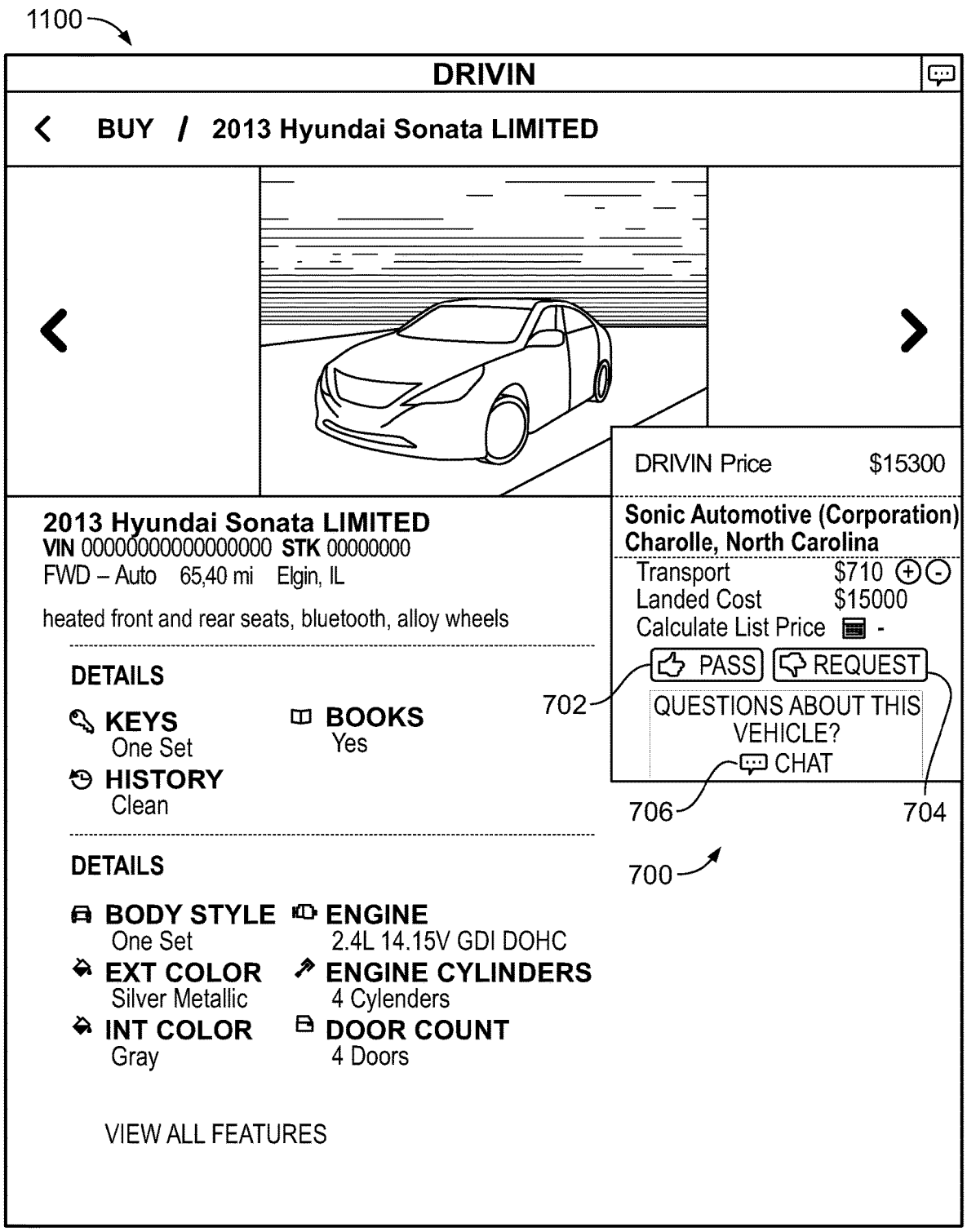
FIG. 7 shows another example user interface presented to a buyer.

FIG. 7 shows an interactive graphical user interface, e.g., vehicle data page, presented on the client terminal that allows the buyer to perform various actions on a specific vehicle identified in response to the command. The actions may include selecting a pass vehicle icon/symbol 702 such as a "thumbs down", a request vehicle icon/symbol 704 such as a "thumbs up.", and/or chat option 706 for a particular vehicle being considered, e.g., 2013 Hyundai Sonata. These options enable the buyer to manage the vehicles presented in response the command.

The pass vehicle option 702 may allow a buyer to indicate that he is not interested in purchasing the vehicle Selection of the pass vehicle option may cause the data platform to send a message to the data platform which indicates that the buyer is not interested in the vehicle. The selection of the pass vehicle option for the particular vehicle may be stored in the sales management database and/or product database. Additionally, the message may cause the data platform not to display the particular vehicle in any subsequent searches or pitches requested by the buyer. In some implementations, the data platform may request that the buyer input of a reason that the pass vehicle option was selected. The reason may be stored as vehicle-related data in the sales management database and may be used by the PTB model to learn the buyer's vehicle preferences.

The request vehicle option 704 may allow the buyer to indicate the buyer has an interest in the particular vehicle. Selection of the request vehicle option may cause the client terminal to send a message to the data platform that a buyer selected the request vehicle option for the vehicle. The data platform may receive this message and the sales management system may store an indication of the buyer's interest in the particular vehicle. Additionally, referring back to FIG. 6, the vehicle 602 may have an indication that the request option was selected for it, e.g., shown as "Requested." In some instances, the sales management system may also determine whether the vehicle was previously pitched to the buyer. Further, after a buyer has selected the request vehicle option 704, contact may be initiated with the seller of the vehicle to inform them that a buyer selected the request vehicle option for the vehicle for sale by the seller. The contact may comprise an account representative sending an email, for instance, to the seller which owns the vehicle informing the seller of the request.

The PTB model may use the pass and request information as vehicle inputs into the PTB model so that the PTB model may determine an accurate PTB score for a given vehicle. For example, if the given vehicle is similar to those vehicles which the buyer has previously requested, then the buyer may be inclined to buy the given vehicle. The PTB model may consider this fact in assigning a PTB score to the given vehicle. A higher PTB score may be assigned to the given vehicles because the buyer requested other vehicles which are similar to the given vehicle.

Conversely, if the given vehicle is similar to those vehicles which the buyer has previously passed on, then the buyer may not be inclined to buy the vehicle for sale. Again, the PTB model may consider this fact in assigning a lower PTB score to the given vehicle than what would be given if the buyer did not pass on the vehicle. Additionally, certain keywords in the reason indicating the reason why the buyer passed may be used to adjust the vehicle-related data input into the model associated with these terms. For example, keywords such as "frame damage" or "high mileage" may indicate that these conditions are not acceptable to the buyer. By inputting this information into the model, the vehicles pitched and/or searched may be more reflective of vehicles that the buyer may purchase.

The chat option 706 is another feature that the data platform may provide to a buyer and/or seller. The chat option 706 may allow a buyer and/or seller (and/or account representative of a seller and/or buyer) to electronically dialog via a respective client terminal and communication network. The chat option 706 may be used by a buyer and/or seller to negotiate about a vehicle such as on pricing or condition of the vehicle. Selection of the chat option 706 may cause a chat window to be presented which allows a buyer, e.g., buyer account representative, or seller, e.g., seller account representative, to communicate electronically and/or in real time with another buyer or seller, for example, to obtain information about the vehicle. The sales management database and/or product database may also be updated with information relating to the chat to improve pitching of the vehicle in the future. For example, words used in the chat indicative what type of vehicle the buyer desires may be input into the sales management database and used by the PTB model, similar to how the pass function would use the reason to adjust the PTB score determination.

FIG. 6 provides an example of this chat window 610. The chat window may allow a buyer to communicate with the seller about the particular vehicle associated when the chat option was selected. In the example chat window 608, a buyer offers a price of $26K for the 2014 Audi which may be the particular vehicle shown on the user interface when the chat option was selected. In response, the seller responds by indicating that she is "on it." When a buyer is viewing a specific vehicle and selects the chat option, the chat window may include an indication that the dialog (e.g., a question about the vehicle) is specific to a certain vehicle by linking the dialog to an image or description of the vehicle as shown in FIG. 6. In one example, vehicle-specific dialog may be presented in as part of the same dialog window as an indication of the vehicle as shown in FIG. 6. This is particularly useful if a buyer or seller asks multiple questions about different vehicles as it provides a way to distinguish between dialogs directed to different vehicles. Although not shown in FIG. 6, if the seller responds to a buyer's question about a particular vehicle, that answer may also be linked to the image or description of the vehicle.

The chat function may also serve as a channel for the seller to pitch vehicles to the buyer and provide updates to the buyer relating to pitched vehicles such as advertisements or price drops associated with a vehicle. Further, the chat may retain a history of communications between the buyer and any other seller, shown as example communications about the two 2013 Hyundai vehicles and the 2014 Audi vehicle. The history of communications may be scrollable so that the buyer can go back to previous communications at any time.

The graphical user interface associated with the vehicle data page may provide other options as well to facilitate buying of a vehicle such as an offer icon which may allow a buyer to make an offer on a vehicle. The offer may then be sent to the seller or account representative for consideration in negotiating a purchase.

In addition to facilitating purchase of vehicles by buyers, the data platform may also facilitate sale of vehicles by a seller and associated management of vehicle inventory for sale by the seller.

Figure 8:
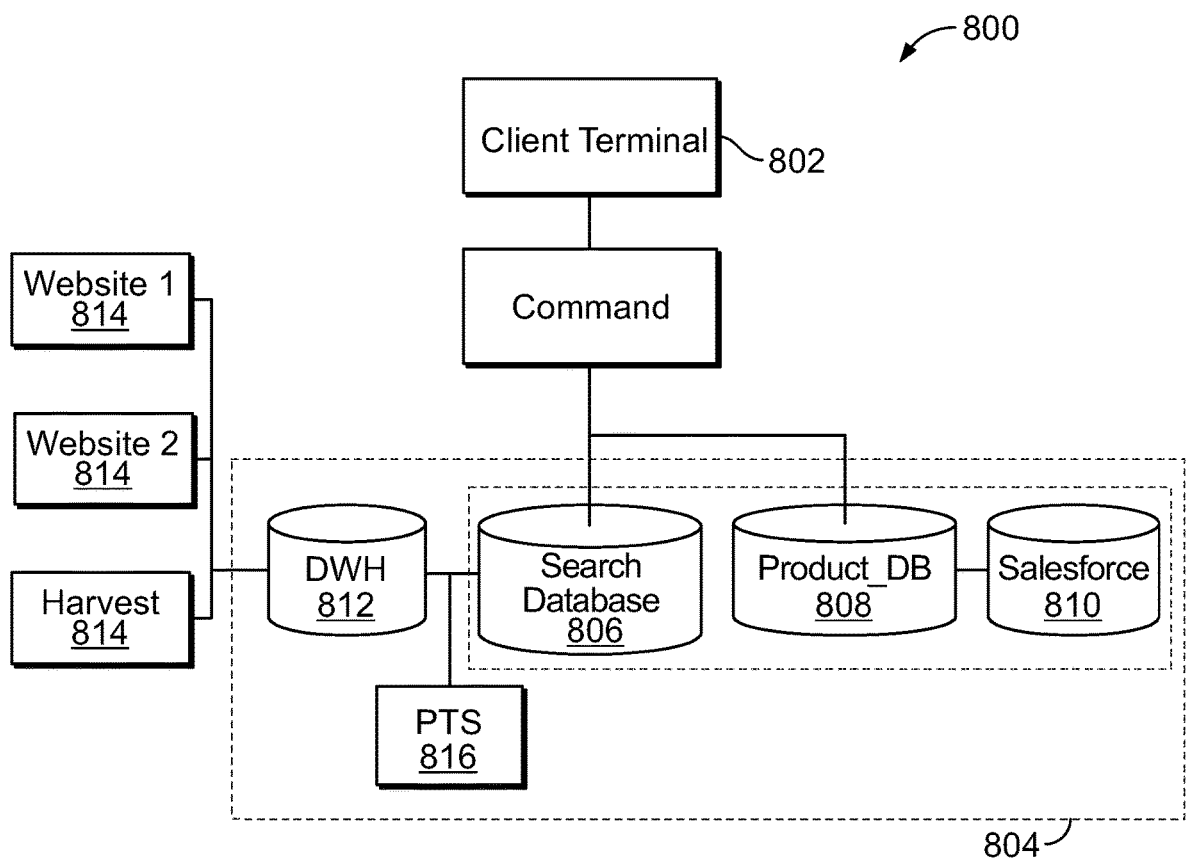
FIG. 8 depicts another more detailed structural diagram of the example data platform.

FIG. 8 shows a block diagram 800 of a network arrangement to facilitate these functions. The network arrangement may be similar to that shown in FIG. 3. For example, the block diagram shows the client terminal 802 which communicates with the data platform 804 via the communication network (not shown). In this case, a seller may use the client terminal 802 to send commands to the data platform 804. The data platform may include the search database 806, product database 808, salesforce management database 810, and data warehouse 812. Additionally, the network arrangement includes a data source 814 which provides access to various websites via the Internet that may have vehicles offered for sale, e.g., and a data science model 816 in the form of a propensity to sell (PTS) model.

Figure 9:
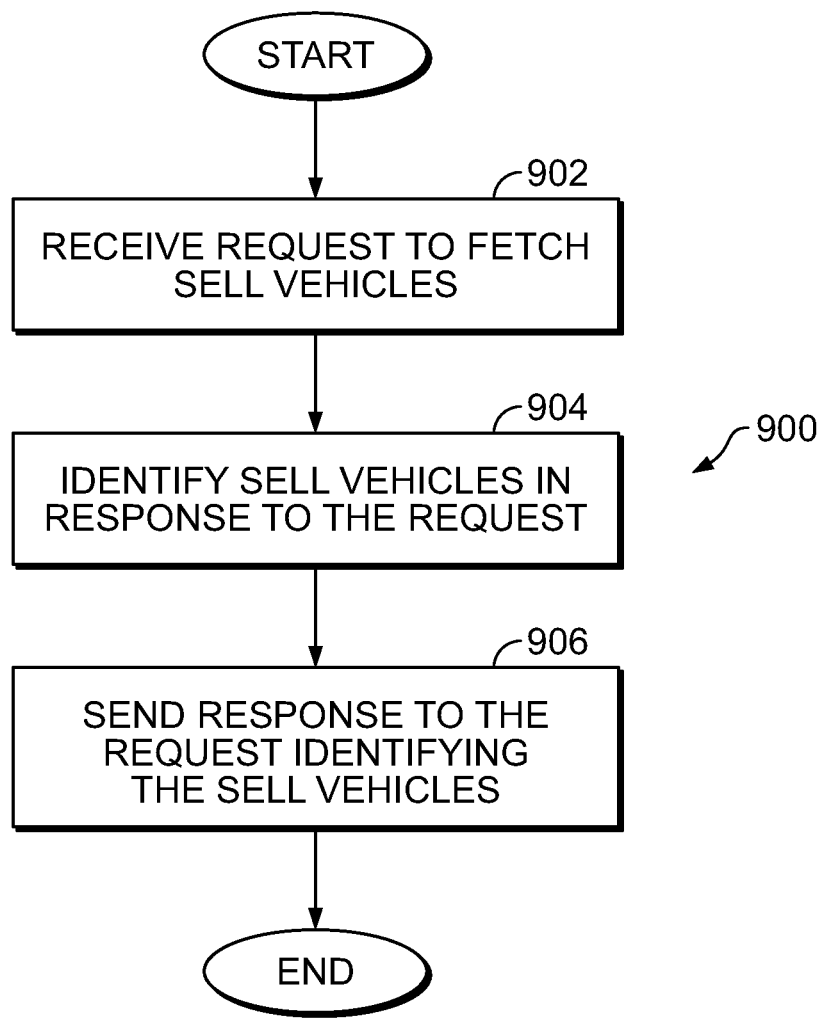
FIG. 9 is a flow diagram of example functions associated with identifying vehicles for sale to a seller.

FIG. 9 shows a flow diagram 900 associated with a request to fetch sell vehicles. The request to fetch sell vehicles may allow the seller to obtain a list of vehicles offered for sale by him. Briefly, at 902, a request to fetch sell vehicles may be received. At 904, sell vehicles may be identified in response to the request. At 906, a response may be sent identifying the sell vehicles.

Referring back, at 902, a seller, via the client terminal, may send a request to fetch sell vehicles to the data platform. The request to fetch sell vehicles may be a request to provide an indication of all or a subset of vehicles which the seller is selling. An identity of the seller may be provided in the request to fetch sell vehicle, e.g., a dealer ID.

At 904, the product database may identify the sell vehicle for the seller in response to the request. For example, each vehicle identified in the product database may have a VIN number identifying a vehicle and data identifying the seller of the vehicle by dealer ID. Based on the identification of the seller received in the request to fetch sell vehicle and the data in the product database associated with a vehicle, the data platform may identify the vehicles which the seller is selling.

At 906, the data platform may send a response to the request identifying those vehicles being sold by the seller. The vehicle may be displayed through a SELL page presented to the seller on the client terminal which identifies the vehicle. The SELL page may list vehicles for sale by the seller. Further, the sell vehicles may be sorted in descending order in accordance with a propensity to sell (PTS) score analogous to the PTB score. The vehicles in the list may be sorted such that those at a top of a list may be more likely to sell compared to those vehicles at a bottom of a list. Additionally, the list may include a number of days which a sell vehicle has been on sale. Still additionally, the list may include a sale price of the sell vehicle. The SELL page may have other information as well.

Figure 10:
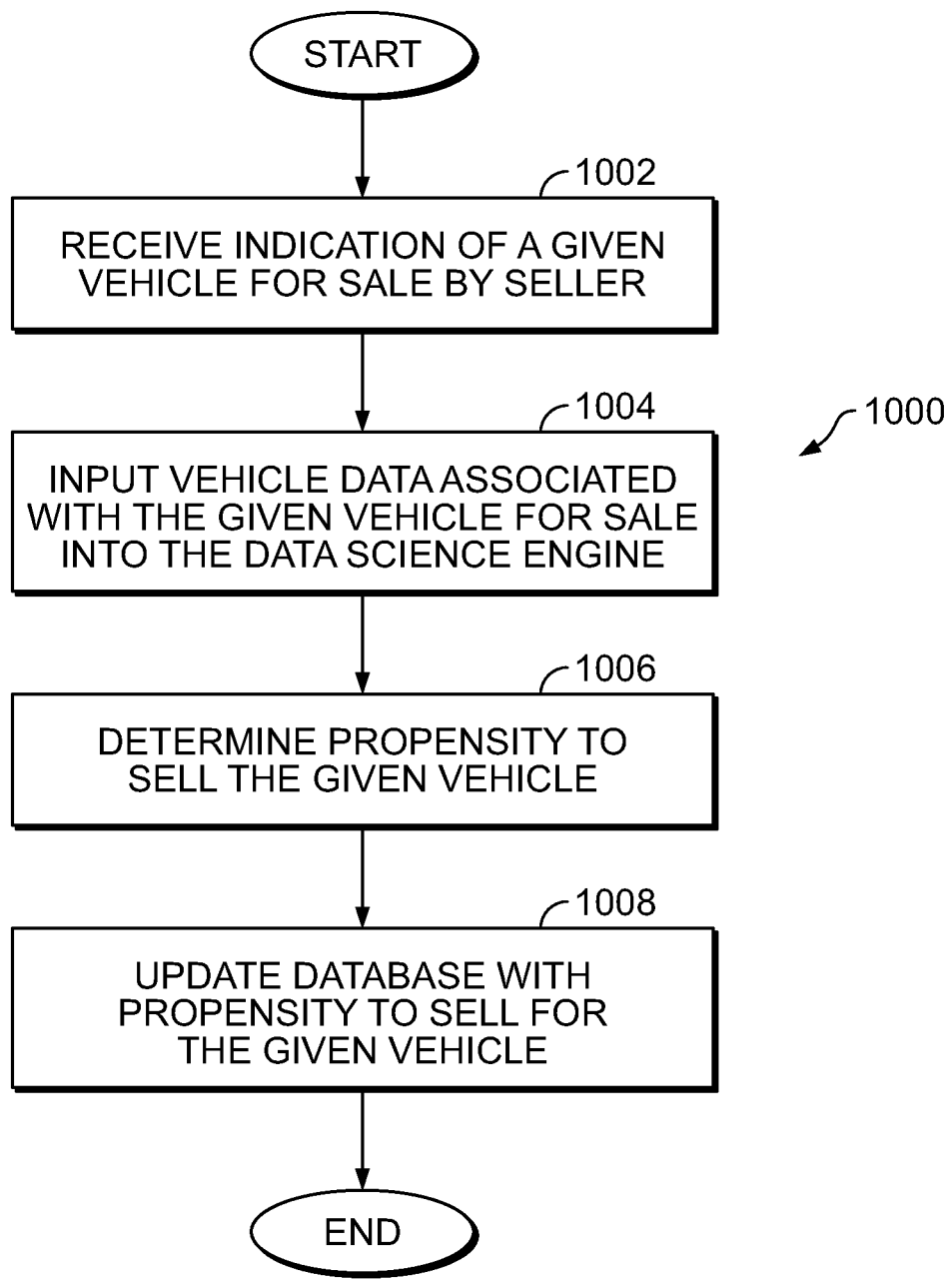
FIG. 10 is a flow diagram of example functions associated with determining a propensity to sell for a seller.

FIG. 10 shows a more detailed flow diagram 1000 associated with functions directed to identifying the sell vehicles to be fetched for the seller. Again, the data science engine may facilitate this process, but now a propensity to sell (PTS) model may be used rather than a PTB model. The PTS model may provide a probability that a given vehicle offered for sale by the seller will sell.

Briefly, at 1002, an indication may be received of a given vehicle for sale by a seller. At 1004, vehicle-related data associated with the given vehicle for sale may be input into the data science engine. At 1006, a propensity to sell the given vehicle is determined. At 1008, a database is updated with the propensity to sell the given vehicle.

Referring back, at 1002, an indication of a given vehicle for sale by the seller may be received. The data source may provide indications of vehicles for sale on third party websites, such as "www.cars.com", "www.ove.com", and even the seller's own website offering vehicles for sale by the seller. The data platform may identify a vehicle for sale by the seller if a seller information in a website for vehicle matches the seller information, e.g., contact information identified by the sales management database such as an address or name of the seller. The data platform may store an indication, e.g., dealer ID, in the product database that the vehicle is a sell vehicle associated with the seller.

At 1004, vehicle-related data for the given vehicle for sale may be input into the data science engine, e.g., PTS model. The vehicle-related data may take a variety of forms.

In one example, the vehicle-related data may include VIN details about a vehicle for sale by the seller, e.g., as indicated by external databases which may list the vehicle for sale such as age and mileage of the vehicle. In another example, the vehicle-related data may include information about a seller such as a size of his lot and/or dealer size provided by the sales management database. A smaller dealer may be looking to make a large profit on a sale and therefore the vehicle will take longer to sell than a larger dealer who may be interested in aggressively selling cars to increase its volume rather than make a large profit.

In addition to vehicle-related data about a seller, vehicle-related data in the form of a market profile may be input into the PTS model. The market profile may identify demand and supply in a market and/or trends in a market where the seller operates, such as which types of vehicles are popular and/or not popular in the market and demand and supply. This information may be related to how quickly a vehicle may sell. Still additionally, historical data associated with the seller may be input into the PTS model. This may include number of vehicles which the seller was able to successfully negotiate and not successfully negotiate. This information may be indicative of whether the seller will sell the particular vehicle.

At 1006, the PTS model may output a probability that a seller may sell the given vehicle, e.g., propensity to sell (PTS) score. The PTS model may be a machine learning model which is arranged to weigh one or more vehicle-related data input into the model. The weighting may be a number from 0 to 1 which is applied to each of the vehicle-related data input. The PTS model may assign a higher weight to seller information than to market profile information in outputting a probability that a seller will sell the vehicle.

A PTS score closer to 100% may indicate that it very likely that the seller will sell the vehicle and a PTS score closer to 0% may indicate that it is very unlikely that the seller will sell the vehicle. Like the PTB model, the PTS model may be built based on various modeling techniques including one or more of a Generalized Linear Model (GLM), Random Forest (RF), Gradient Boosted Machine (GBM) and multi-layer, feedforward Deep Learning algorithm, among others to find a best weighing of the vehicle-related data input into the model that results in output of a reliable probability. Before being deployed to sellers, the PTS model may be tested on known vehicle-related data and known probabilities that a seller will sell a vehicle to verify that the model outputs a reliable probability.

At 1008, the product database may be updated with the propensity to sell score for the given vehicle. For example, the propensity to sell score may be stored with a VIN number of a vehicle and an indication of the seller of the vehicle, e.g., a dealer ID.

The data platform may repeat the functions at 1002 to 1008 to determine a PTS score for one or more vehicles. Further, the PTS score for a vehicle may be updated periodically, e.g., daily, weekly, monthly etc., and may be updated manually at the direction of a human or automatically by the platform based on a predefined schedule. The update may account for changes in the vehicle-related data that is input into the model, e.g., mileage, age, etc. that might affect the PTS score output by the PTS model for a given vehicle.

When the data platform assembles the list of vehicles to be presented in a SELL page in response to the fetch sell vehicles command, the data platform may search for those vehicles with a dealer ID that matches the seller and of those vehicles sort by PTS score so that the displayed vehicles are sorted in descending order in accordance with the PTS score. Higher PTS score may be presented earlier in a list of vehicles. Again, ordering the vehicles for sale by PTS score may allow a seller to focus his attention on those vehicles which may or may not sell so that he can move vehicle inventory as quickly as possible. Otherwise, the seller may need to find those vehicles with low or high propensity to sell from potentially hundreds of listings.

In some cases, the PTS score may also be indicative a willingness of the seller to sell the vehicle. For example, if the seller has already certain types of vehicles on his lot and/or a type of vehicle is slow to sell in a market, then the seller may be willing to sell the vehicle to move inventory. Additionally, or alternatively, the PTS score can be an indication of whether a negotiation can be concluded with a third party where the seller may agree to allow a third party to sell the vehicle for the seller. In some cases, the third party could be an account manager for the seller who facilitates movement of vehicle inventory for the seller. If the vehicle has a high PTS score, then the third party may conclude a negotiation with the seller. Before or after this negotiation, the third party may also consider the PTB score of the vehicle for various buyers stored by the data platform to identify a buyer for the vehicle, e.g., a buyer with a highest PTB score.

In addition to identifying vehicles for sale by the seller via third party websites and the seller's website, the network arrangement may allow for the seller to add a vehicle for sale. Adding a vehicle to the product database may be effectively be an offer by the seller to sell a vehicle which can be later searched by a buyer or pitched to a buyer. By providing this feature, the product database may be populated with vehicles in addition to those identified by the data source, e.g., the websites on the Internet.

A wholesale request may be presented as a graphical user interface on the client terminal for the seller to select to start the process of adding a vehicle for sale. Selection of this option may require the seller to indicate a condition of the vehicle. In turn, the data platform may cause the use a client terminal to present one or more condition forms to the seller for completion. One purpose of the condition forms is to provide detailed information to a potential buyer of the vehicles once offered for sale. These condition forms may be made available to buyers for vehicles which are pitched and/or searched by the buyer so that he can review the condition of the vehicle in making a decision whether to purchase it.

FIG. 11 shows one example 1100 of this condition form. The condition form may request the seller to input various condition information for the vehicle. For example, the condition may include one or more of a frame condition, mechanical condition, electrical condition, interior condition of the vehicle, among others. To reduce the time needed to complete this form, some condition information may be preselected to reflect a common condition for that condition. For example, a frame condition of "frame/structure has been repaired" may be preselected from the options of "no frame/structural damage", "frame/structure has been repaired", and "frame has unrepaired damage." The preselected option may represent a most common condition of vehicles sold in a region. The data platform may monitor condition of vehicles for sale in a region and identify common condition of vehicles. As the condition of vehicles in the region changes, the preselected information may change to reflect the common condition. For example, if many vehicles being offered for sale in the region do not have frame/structural damage, when before such vehicles were not commonly offered for sale in the area, the "frame/structural" may be preset when before it was not. Other variations are also possible. The completed condition form may be stored in the product database and/or sales management, among other databases.

Figure 12:
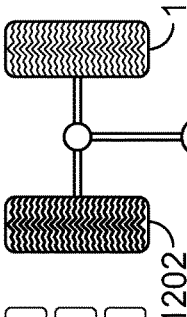
FIG. 12 shows another example user interface presented to a seller.

FIG. 12 shows another example 1200 of this condition form. The example 1200 may be a graphical user interface for marking tire tread. The tire tread may be indicated for each tire by indicating an amount of tire tread left for each tire of the vehicle offered for sale. Additionally, a gray level correlated to the tire tread may be shown on the graphical user interface. For example, an image of the tire tread 1202 may be shown in heavy black indicative of a large tread depth, e.g., $12/32"$, while the image of the tread 1204 may be shown as light gray indicative of a small tread depth, e.g., $8/32$. The visual may enable quick assessment of tire quality without having to read the actual tread depths. Again, the completed condition form may be stored in the product database and/or sales management, among other databases.

Figure 13:
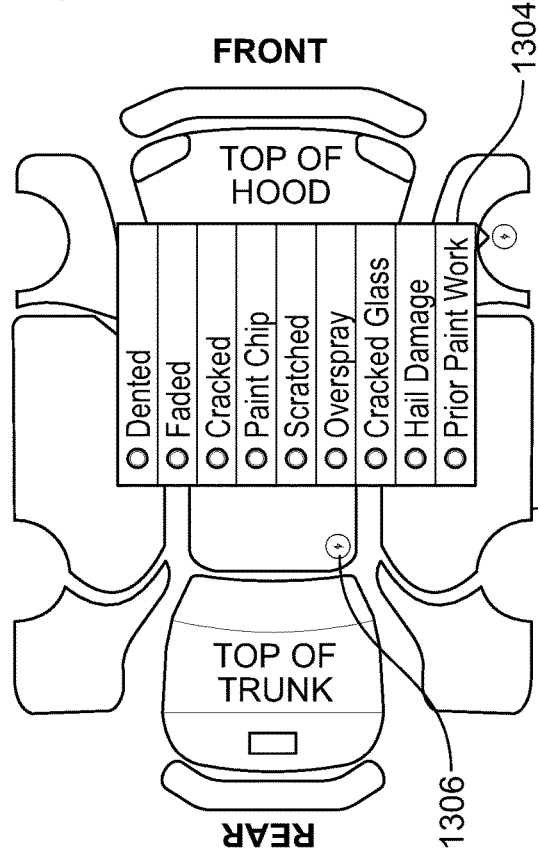
FIG. 13 shows yet another example user interface presented to a seller.

FIG. 13 shows yet another example 1300 of this condition form. The example 1300 may be an example graphical user interface for marking defects on a body of the vehicle. The graphical user interface may show body panels 1302 for a vehicle. In some cases, the body panels may be sized and/or shaped in accordance with a type of a vehicle. For instance, body panels for a truck may be illustrated differently from body panels of a car. A seller may provide an indication of where a defect is present on a body panel such as a mouse click at that location. The data platform may store an indication of this location where the defect is located on the body panel which can be used to facilitate identification of defects. The location may be identified by an identification of the body panel where the defect exists and a coordinate e.g., (x,y) pair, which uniquely identifies a location of the defect on the body panel. For instance, the location of the defect may be identified as left door panel and coordinate (4,5). Alternatively, the coordinate may uniquely identify the location of the defect on the vehicle itself. In this regard, the coordinate (4,5) may itself identify that the defect is on the left door panel.

The indication may also responsively cause a menu 1304 to be presented to the seller so that the seller can further identify a type of a defect on the body of the vehicle, e.g., dented, faded, cracked, paint chip, etc. The type of defect may additionally be shown on the illustrated body panels by a unique symbol. For example, a circle 1306 may symbolize a dent. In some cases, the condition form may allow for the seller to provide to the data platform a digital image of the defect which is associated with the symbol. In turn, hovering a mouse cursor over the symbol may cause a picture of the defect to be displayed, e.g., when a buyer reviews the condition form. Other variations are also possible. The completed condition form may be stored in the product database and/or sales management, among other databases.

In addition to completing one or more of the described condition forms, a seller may also complete a price form to offer a vehicle for sale. The price form may request that the seller indicate a price for the vehicle. In one example, the seller may provide this price. In another example, the data platform may provide pricing instead of the seller having to provide the pricing.

FIG. 14 shows an example of a pricing form that is provided by the data platform in the form of a graphical user interface. The data platform may include one or more prices associated with the vehicle. In some cases, certain prices may be preset in the form at 1402 for review by the seller. Via the client terminal, the seller can either accept one or more of these prices or modify the pricing. The data platform may then associate in the sales management database the price along the other condition information with the vehicle. Then, the data platform may store an indication of the vehicle offered for sale by the seller in the product database and compute a PTS score and/or PTB score for the vehicle and present the vehicle as a result of a pitch request, search request, fetch sell vehicles etc.

The pricing provided by the data platform may be a retail or wholesale price defined by a third-party database such as "Kelly Bluebook" or "NADA." The information that the seller provided in the condition form may be provided to the third-party database and the third-party database may return a pricing. In some cases, access to the third-party databases may be facilitated by the data source. Alternatively, a pricing model may be used to provide the pricing. The pricing model may be a machine learning model that predicts pricing for the vehicle by weighing various inputs into the model.

In one example, the pricing may be that which a vehicle will sell for at auction. Based on a condition of the vehicle indicated by the condition form, a trim level, and vehicle options, wholesale pricing for the vehicle, and retail pricing for the vehicle can be determined. For instance, sold prices associated with past deals of similar vehicles may be indicative of a wholesale price. As another example, pricing of vehicles currently for sale on websites such as cars.com may be indicative of a retail price. The wholesale and retail pricing may be input into the pricing model along with any negotiations between buyers and sellers (e.g., stored in the sales management database) associated with the specific vehicle or vehicle type and the model may output an auction price for the vehicle. The auction pricing may tell the seller a price that the vehicle may sell for at auction.

In another example, the pricing may be a sales price associated with what a given buyer would buy the vehicle for. Based on a condition of the vehicle indicated by the condition form, a trim level, and vehicle options, wholesale pricing for the vehicle and retail pricing for the vehicle over a past period of time, e.g., 45 days, can be determined. A PTB score may be used by the model as an indication of success in the given buyer buying the vehicle. In this regard, the wholesale and retail pricing along with, in some cases, a PTB score for the vehicle may be input into the pricing model and the model may output a price for the vehicle indicative of what the given buyer would buy the vehicle for.

In some examples, the pricing model may be used to provide guidance to a seller in deciding whether to sell a vehicle. If the pricing model indicates that the auction price the seller is able to get at auction is more than what a buyer is offering, the seller can decide to reject the offer based on the pricing model. The pricing model may also be used by a buyer in deciding to buy a vehicle. If the pricing model shows that the value of a vehicle is more than what the buyer originally offered, the buyer knows that he/she can increase the offer and still remain profitable. Other variations are also possible.

The data science engine may also have a recommender model in addition to the PTS model. The recommender model may be a machine learning model that recommends for the seller to buy certain vehicles to sell on its lot. The recommender model may take as input for a dealer historical information on past sales by the dealer such as a number of sales of vehicles, days of supply of vehicles, average days on lot for vehicles, and number of sales of vehicles in the dealer's market. The recommender model may take this input, weight the input, and output an indication of a probability of how successful the seller may be in selling different types of vehicles. In this regard, the recommender model may be used to identify suitable inventory for the seller to buy. A high score may indicate that a type of vehicle is a good match for the seller to sell. On the other hand, a low score may indicate that a type of vehicle is not a good match for the seller to sell.

For instance, if the dealer is able to quickly move Ford F-150s and 5 other dealers in the market are also good at moving those trucks, the recommender model may recommend those vehicles. The data platform may cause the client terminal to display a list of these recommended vehicles. The list may identify a make/model year of the vehicles that are recommended. Unlike the PTB model, specific vehicles, e.g., by VIN number, may not be identified.

In addition to the various user interfaces described herein, other user interfaces may also be presented to a user in connection with the data platform to facilitate purchase and sale of vehicles or for other purposes. Examples of such user interfaces are shown and described in U.S. Provisional Application Ser. Nos. 62/311,378 and 62/311,841, the contents each of which are herein incorporated by reference in its entirety.

Figure 15:
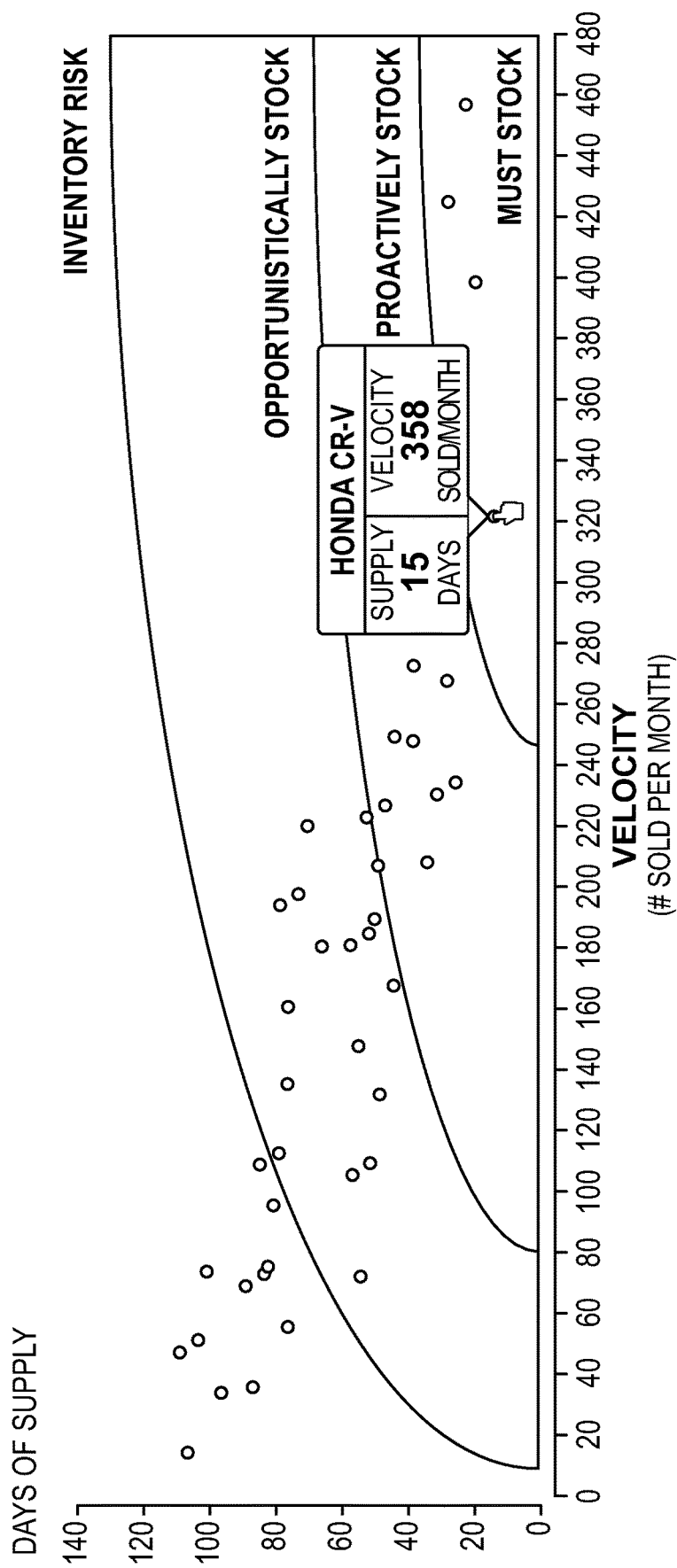
FIG. 15 is an example user interface associated with sales and supply in a marketplace.

For example, FIG. 15 shows a graphical user interface associated with a market supply of automobiles by make/model as a function of velocity at which each make/model is being sold in the market. The graphical user interface may be used to determine a dealer's optimal automobile inventory and specific automobiles for purchase by the dealer. More specifically, this graphical user interface shows the market supply of a make/model in terms of the number of days based on the velocity at which a particular make/model sells in the dealer's market. As one example, in the dealer's market, which is defined here as a 25-mile radius, there is a 15-day supply of Honda CR-Vs having a velocity of 358 Honda CR-Vs sold per month. Accordingly, there are approximately 179 Honda CR-Vs currently available based on a 30-day month. A dealer may use this information in deciding which types of vehicles to stock. The velocity and/or supply may be a present condition of a market based on past historical sales data. Alternatively, the velocity and/or supply may be a prediction of the market. In this case, the PTB score and/or PTS score may be used to determine one or more of the velocity and days of supply for sales in the future. For example, a high PTB and/or PTS may indicate that vehicles may sell quickly resulting in a higher velocity resulting in a lower days of supply. Likewise, a low PTB and/or PTS may indicate that vehicles may sell slower resulting in a lower velocity resulting in higher days of supply. In addition to showing the various automobile makes/models available in the dealer's market, the graphical user interface also provides an indication of which makes/models are "must stock," "proactively stock," "opportunistically stock," or "inventory risk." Must stock vehicles may be vehicles that the dealer could easily sell while inventory risk vehicles may be vehicles which the dealer may have a harder time to sell. Proactively stock and opportunistically stock may be vehicles that fall in between these two bounds. In some cases, the velocity and days of supply by be used as inputs for the PTB and/or PTS models.

Figure 16:
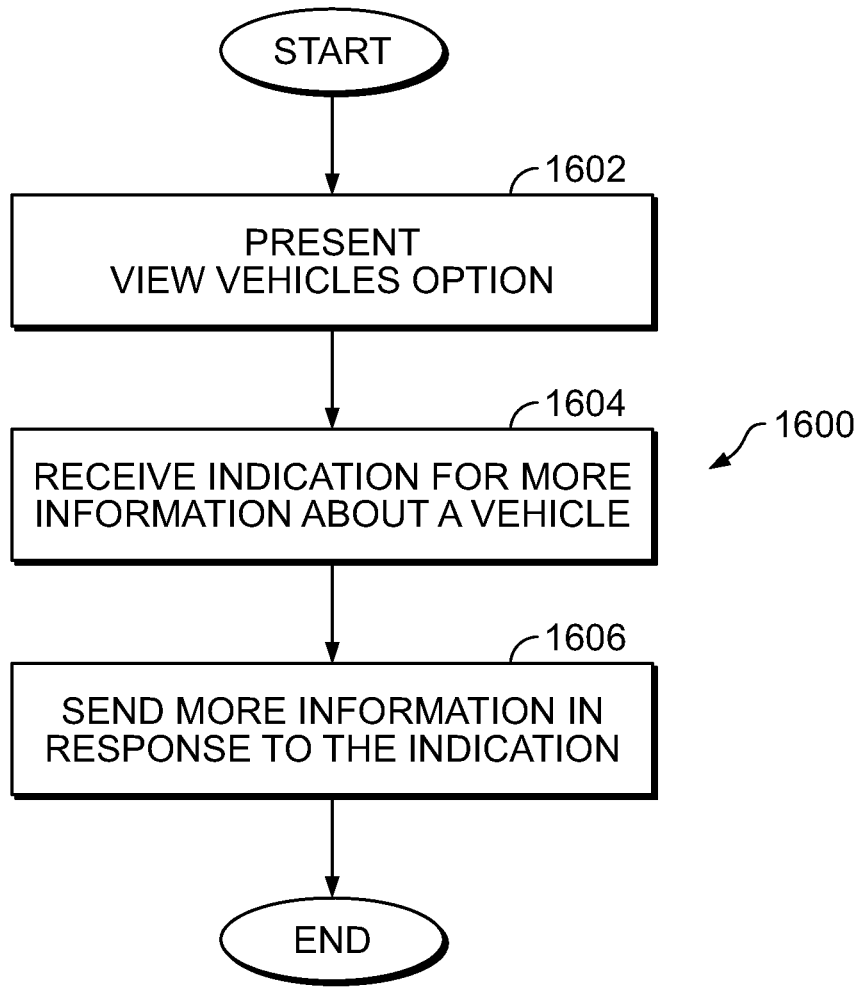
FIG. 16 is a flow diagram of example functions associated with obtaining information about a vehicle.

FIG. 16 shows a flow diagram associated with viewing additional information about a vehicle to assist a buyer in buying a vehicle and a seller in selling a vehicle. At 1602, the client terminal may present a View Vehicles option on the client terminal. Selection of the View Vehicles option may cause the data platform at 1604 to receive an indication that more information about a vehicle is requested. At 1606, the data platform may respond by sending additional information associated with the vehicle back to the client terminal.

The information sent may depend on whether the requestor is a buyer or seller. If the requestor is a buyer, then the information may include whether the vehicle is being pitched to the buyer along with whether the buyer previously considered the vehicle (e.g., requested) and/or decided against purchasing the vehicle (e.g., passed). If the requestor is a seller, then the information may include whether the vehicle is owned by the seller and/or a status of the vehicle such as whether it is being currently being negotiated for sale.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only ways) to implement such systems, methods, apparatus, and/or articles of manufacture.

Additionally, references herein to an "example" or "embodiment" means that a particular feature, structure, or characteristic described in connection with the example or embodiment can be included in at least one example embodiment of an invention. The appearances of these phrase in various places in the specification are not necessarily all referring to the same example or embodiment, nor are separate or alternative examples or embodiments mutually exclusive of other examples or embodiments. As such, the examples and embodiments described herein, explicitly and implicitly understood by one skilled in the art, can be combined with other examples and/or embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example embodiments of the disclosed innovations have been described above. Those skilled in the art will understand, however, that changes and modifications may be made to the embodiments described without departing from the true scope and spirit of the present invention, which will be defined by the claims.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

The term buyer as used herein may refer to both a buyer who is an end purchaser of a vehicle, a dealer, and/or a representative of the buyer who facilitates a buying process for the buyer. Similarly, the term seller as used herein may refer to both a seller who has a vehicle to sell vehicle such as a dealer and/or a representative of the seller who facilitates the process of selling the vehicle for the seller.

What is claimed is:

1. A method comprising:
   causing an interactive graphical user interface to be displayed on a client terminal, the interactive graphical user interface comprising a blank car panels diagram of a sell vehicle, the sell vehicle including a top side, a front side, a rear side, a driver's side, and a passenger's side, the blank car panels diagram comprising at least one panel on the top side, at least one panel on the front side, at least one panel on the rear side, at least one panel on the driver's side, and at least one panel on the passenger's side;
   receiving, from interaction of a client to the interactive graphical user interface on the blank car panels diagram of the sell vehicle, an indication of a defect at a given location on the at least one panel on the top side, the at least one panel on the front side, the at least one panel on the rear side, the at least one panel on the driver's side, or the at least one panel on the passenger's side;
   causing a menu to be displayed on the client terminal, wherein the menu lists one or more types of defects on the sell vehicle;
   receiving selection of one of the one or more types of defects from the menu;
   causing a symbol indicative of the type of defect to be displayed on the interactive graphical user interface of the blank car panels diagram of the sell vehicle;
   determining, based on the selection of the one or more types of defects from the client, a price for the sell vehicle;
   storing the price for the sell vehicle in a database to indicate that the sell vehicle is for sale at the price;
   receiving, from the database, vehicle-related data associated with a plurality of vehicles for sale including the sell vehicle;
   executing, by a processor, a data science engine on the vehicle-related data for the plurality of vehicles to determine a propensity to buy score for the sell vehicle, wherein the data science engine comprises a machine learning model indicative of a propensity of a buyer to buy a respective vehicle of the plurality of vehicles for sale;
   storing the propensity to buy score for the sell vehicle;
   determining, based on the propensity to buy score for the sell vehicle and the price for the sell vehicle, a buyer price for the sell vehicle, the buyer price indicative of what the buyer would buy the sell vehicle for; and
   causing a client terminal to output the buyer price indicative of what the buyer would buy the sell vehicle for.

2. The method of claim 1, further comprising:
   inputting the vehicle-related data for the plurality of vehicles into a data science engine comprising a machine learning model indicative of a propensity of a seller to sell a vehicle;
   executing the data science engine on the vehicle-related data for the plurality of vehicles to determine a propensity to sell score for a respective vehicle, wherein the data science engine comprises a machine learning model indicative of a propensity of a seller to sell a vehicle;

storing the propensity to sell score for the respective vehicle in the database;

sorting each of the plurality of vehicles for sale by the seller by the propensity to sell score; and causing the client terminal to display a list of vehicles for the seller to sell wherein the list comprises the plurality of vehicles and the list is ordered such that a first vehicle in the list has a highest propensity to sell score and a last vehicle in the list has a lowest propensity to sell score.

3. The method of claim 1, further comprising:

causing a client terminal to display a list of vehicles for the buyer to buy, wherein the list is ordered such that a first vehicle in the list has a highest propensity to buy score and a last vehicle in the list has a lowest propensity to buy score;

receiving a selection by one of a buyer or a seller of a specific vehicle in the list of vehicles of a request to chat regarding the specific vehicle;

responsive to receiving the selection, causing a chat window to be presented to the one of the buyer or the seller, the chat window indicative of a chat for the specific vehicle and including a history of communication that is scrollable, including a plurality of communications and respective separate dates associated with the plurality of communications associated with the specific vehicle;

receiving, from the one of the buyer or the seller, a chat communication;

forwarding the chat communication to another of the buyer or the seller; and receiving a response to the chat communication from the another of the buyer or the seller.

4. The method of claim 3, wherein the history of communication includes a plurality of communications, with each of the plurality of communications having an associated date of transmission.

5. The method of claim 1, further comprising:

receiving, via the client terminal, a request to receive information from a seller about a given vehicle from the plurality of vehicles;

sending the request to receive information to the seller; and executing the data science engine based on the request to receive information to determine a revised propensity to buy score for a respective vehicle of the plurality of vehicles.

6. The method of claim 1, further comprising:

transmitting a list of vehicles for the buyer to buy, wherein the list is ordered such that a first vehicle in the list has a highest propensity to buy score and a last vehicle in the list has a lowest propensity to buy score;

receiving, via the client terminal, an indication that a given vehicle of the list of vehicles is not of interest to the buyer and a reason why the given vehicle is not of interest; and executing the data science engine based on the given vehicle being not of interest to determine a revised propensity to buy score for a respective vehicle of the plurality of vehicles.

7. The method of claim 1, further comprising:

presenting a preselected option, as one of a plurality of options indicative of a condition of a sell vehicle, as a most frequently selected option for vehicles sold in a locality; and receiving, from a seller, a selected condition of the sell vehicle from the plurality of options.

8. The method of claim 1, further comprising:

receiving an indication of a first tread depth of a first tire and a second tread depth of a second tire of a sell vehicle; and causing a graphical representation of the first tread depth to be displayed at a first gray level, wherein the graphical representation of the second tread depth is displayed at a second gray level, wherein the first tread depth is greater than the second tread depth and wherein the first gray level is darker than the second gray level.

9. The method of claim 1, wherein placement of the symbol on the interactive graphical user interface of the blank car panels diagram of the sell vehicle is based on a mouse click input via the interactive graphical user interface at a location on the blank car panels diagram.

10. The method of claim 9, wherein the location comprises an identification of a respective body panel selected from the at least one panel on the top side, the at least one panel on the front side, the at least one panel on the rear side, the at least one panel on the driver's side, and the at least one panel on the passenger's side.

11. The method of claim 10, wherein the location further comprises a coordinate that uniquely identifies the location of the defect on the respective body panel.

12. The method of claim 1, further comprising:

receiving an image of the defect;

associating the image with the symbol on the interactive graphical user interface; and causing the interactive graphical user interface to output the image responsive to hovering a cursor over the symbol.

13. The method of claim 1, wherein the at least one panel on the top side, the at least one panel on the front side, the at least one panel on the rear side, the at least one panel on the driver's side, and the at least one panel on the passenger's side are spaced apart from one another.

14. A system comprising:

a database; and a processor in communication with the database and configured to:

cause an interactive graphical user interface to be displayed on a client terminal, the interactive graphical user interface comprising a blank car panels diagram of a sell vehicle, the sell vehicle including a top side, a front side, a rear side, a driver's side, and a passenger's side, the blank car panels diagram comprising at least one panel on the top side, at least one panel on the front side, at least one panel on the rear side, at least one panel on the driver's side, and at least one panel on the passenger's side;

receive, from interaction of a client to the interactive graphical user interface on the blank car panels diagram of the sell vehicle, an indication of a defect at a given location on the at least one panel on the top side, the at least one panel on the front side, the at least one panel on the rear side, the at least one panel on the driver's side, or the at least one panel on the passenger's side;

cause a menu to be displayed on the client terminal, wherein the menu lists one or more types of defects on the sell vehicle;

receive selection of one of the one or more types of defects from the menu;

cause a symbol indicative of the type of defect to be displayed on the interactive graphical user interface of the blank car panels diagram of the sell vehicle;

determine, based on the selection of the one or more types of defects from the client, a price for the sell vehicle;

storing the price for the sell vehicle in a database to indicate that the sell vehicle is for sale at the price;

receive, from the database, vehicle-related data associated with a plurality of vehicles for sale including the sell vehicle;

execute a data science engine on the vehicle-related data for the plurality of vehicles to determine a propensity to buy score for the sell vehicle, wherein the data science engine comprises a machine learning model indicative of a propensity of a buyer to buy a respective vehicle of the plurality of vehicles for sale;

store the propensity to buy score for the sell vehicle in the database;

determine, based on the propensity to buy score for the sell vehicle and the price for the sell vehicle, a buyer price for the sell vehicle, the buyer price indicative of what the buyer would buy the sell vehicle for; and cause a client terminal to output the buyer price indicative of what the buyer would buy the sell vehicle for.

15. The system of claim 14, wherein the processor is further configured to:

input the vehicle-related data for the plurality of vehicles into a data science engine comprising a machine learning model indicative of a propensity of a seller to sell a vehicle;

execute the data science engine on the vehicle-related data for the plurality of vehicles to determine a propensity to sell score for a respective vehicle, wherein the data science engine comprises a machine learning model indicative of a propensity of a seller to sell a vehicle;

store the propensity to sell score for the respective vehicle in the database;

sort each of the plurality of vehicles for sale by the seller by the propensity to sell score; and cause the client terminal to display a list of vehicles for the seller to sell wherein the list comprises the plurality of vehicles and the list is ordered such that a first vehicle in the list has a highest propensity to sell score and a last vehicle in the list has a lowest propensity to sell score.

16. The system of claim 14, wherein the processor is further configured to:

transmit a list of vehicles for the buyer to buy, wherein the list is ordered such that a first vehicle in the list has a highest propensity to buy score and a last vehicle in the list has a lowest propensity to buy score;

receive a selection by one of a buyer or a seller of a specific vehicle in the list of vehicles of a request to chat regarding the specific vehicle;

responsive to receiving the selection, cause a chat window to be presented to the one of the buyer or the seller, the chat window indicative of a chat for the specific vehicle and including a history of communication that is scrollable, including a plurality of communications and respective separate dates associated with the plurality of communications associated with the specific vehicle;

receive, from the one of the buyer or the seller, a chat communication;

forward the chat communication to another of the buyer or the seller; and receive a response to the chat communication from the another of the buyer or the seller.

17. The system of claim 14, wherein the processor is configured to place the symbol on the interactive graphical user interface of the blank car panels diagram of the sell vehicle based on a mouse click input via the interactive graphical user interface at a location on the blank car panels diagram.

18. The system of claim 17, wherein the location comprises an identification of a respective body panel selected from the at least one panel on the top side, the at least one panel on the front side, the at least one panel on the rear side, the at least one panel on the driver's side, and the at least one panel on the passenger's side.

19. The system of claim 18, wherein the location further comprises a coordinate that uniquely identifies the location of the defect on the respective body panel.

* * * * *